(12) United States Patent
Weissmann et al.

(10) Patent No.: US 11,966,742 B2
(45) Date of Patent: *Apr. 23, 2024

(54) APPARATUSES, METHODS, AND SYSTEMS FOR INSTRUCTIONS TO REQUEST A HISTORY RESET OF A PROCESSOR CORE

(71) Applicant: Intel Corporation, Santa Clara, CA (US)

(72) Inventors: Eliezer Weissmann, Haifa (IL); Mark Charney, Lexington, MA (US); Michael Mishaeli, Haifa (IL); Robert Valentine, Kiryat Tivon (IL); Itai Ravid, Beit Itzhaq (IL); Jason W. Brandt, Austin, TX (US); Gilbert Neiger, Portland, OR (US); Baruch Chaikin, D.N. Misgav (IL); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,810

(22) Filed: May 3, 2023

(65) Prior Publication Data

US 2023/0273795 A1    Aug. 31, 2023

Related U.S. Application Data

(63) Continuation of application No. 17/903,307, filed on Sep. 6, 2022, now Pat. No. 11,645,080, which is a
(Continued)

(51) Int. Cl.
*G06F 9/38* (2018.01)
*G06F 9/30* (2018.01)

(52) U.S. Cl.
CPC ........ *G06F 9/3851* (2013.01); *G06F 9/30043* (2013.01); *G06F 9/30076* (2013.01);
(Continued)

(58) Field of Classification Search
None
See application file for complete search history.

(56) References Cited

U.S. PATENT DOCUMENTS

| 9,703,566 B2 | 7/2017 | Brandt et al. |
| 10,108,554 B2 | 10/2018 | Matas et al. |
| (Continued) | | |

OTHER PUBLICATIONS

Intel, "Intel(registered) Architecture Instruction Set Extensions and Future Features Programming Reference", Future Intel(registered) Architecture Instruction Extensions and Features, Ref. No. 319433-041, Oct. 2020, 211 pages.
(Continued)

*Primary Examiner* — Keith E Vicary
(74) *Attorney, Agent, or Firm* — NICHOLSON DE VOS WEBSTER & ELLIOTT LLP

(57) ABSTRACT

Systems, methods, and apparatuses relating to instructions to reset software thread runtime property histories in a hardware processor are described. In one embodiment, a hardware processor includes a hardware guide scheduler comprising a plurality of software thread runtime property histories; a decoder to decode a single instruction into a decoded single instruction, the single instruction having a field that identifies a model-specific register; and an execution circuit to execute the decoded single instruction to check that an enable bit of the model-specific register is set, and when the enable bit is set, to reset the plurality of software thread runtime property histories of the hardware guide scheduler.

20 Claims, 25 Drawing Sheets

Related U.S. Application Data continuation of application No. 17/124,813, filed on Dec. 17, 2020, now Pat. No. 11,436,018.

(60) Provisional application No. 62/968,861, filed on Jan. 31, 2020.

(52) U.S. Cl.
CPC ........ G06F 9/30101 (2013.01); G06F 9/3836 (2013.01); G06F 9/3842 (2013.01)

(56) References Cited

U.S. PATENT DOCUMENTS

| | | | |
|---|---|---|---|
| 11,436,018 B2 | 9/2022 | Weissmann et al. | |
| 11,645,080 B2 * | 5/2023 | Weissmann | G06F 9/30076 712/220 |
| 2009/0089564 A1 | 4/2009 | Brickell et al. | |
| 2015/0032998 A1 | 1/2015 | Rajwar et al. | |
| 2019/0042280 A1 | 2/2019 | Shanbhogue et al. | |
| 2019/0042479 A1 | 2/2019 | Basak et al. | |
| 2019/0324756 A1 | 10/2019 | Chappell et al. | |
| 2020/0004959 A1 | 1/2020 | Chappell et al. | |
| 2020/0133679 A1 | 4/2020 | Brandt et al. | |
| 2020/0210197 A1 | 7/2020 | Asanovic et al. | |
| 2021/0064426 A1 | 3/2021 | Gupta et al. | |
| 2021/0200580 A1 | 7/2021 | Yasin et al. | |
| 2021/0303054 A1 | 9/2021 | Zhu et al. | |

OTHER PUBLICATIONS

Non-Final Office Action, U.S. Appl. No. 17/124,813, dated Dec. 24, 2021, 15 pages.

Notice of Allowance, U.S. Appl. No. 17/124,813, dated May 6, 2022, 8 pages.

Notice of Allowance, U.S. Appl. No. 17/903,307, dated Jan. 10, 2023, 12 pages.

Rotem et al., "Alder Lake Architecture", 2021 IEEE Hot Chips 33 Symposium (HCS), Intel, IEEE, 2021, 23 pages.

* cited by examiner

OS Usage Model 801

CPUID[HRESET] = CPUID[7,1][22]
CPUID[HRESET_CAP ] = CPUID[32,0].EBX

OS

OS context switch flow:
Save Current S/W thread context
If (CPUID[HRESET]) {
    MOV EAX, OS_HRESET_CAP
    HRESET EAX
}
Resume new S/W thread context OS HRESET INIT flow:
If (CPUID[HRESET]) {
OS_HRESET_CAP = CPUID[HRESET_CAP]
WRMSR IA32_HRESET_CTL, HRESET_CAP }

FIG. 8A

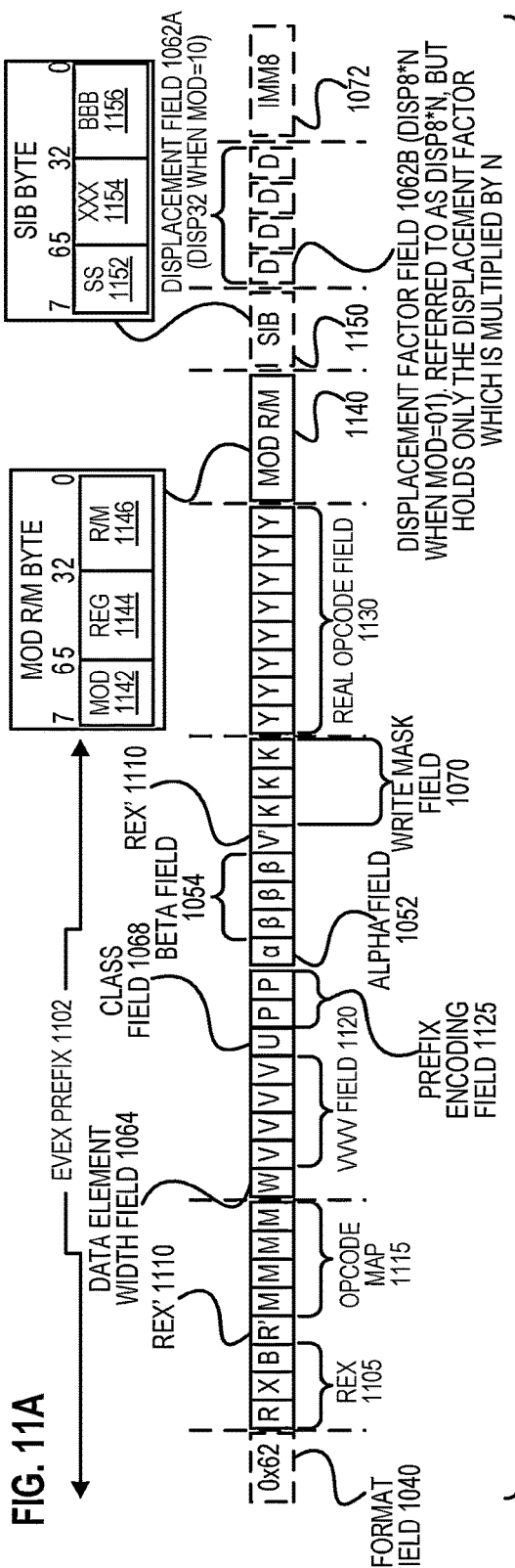

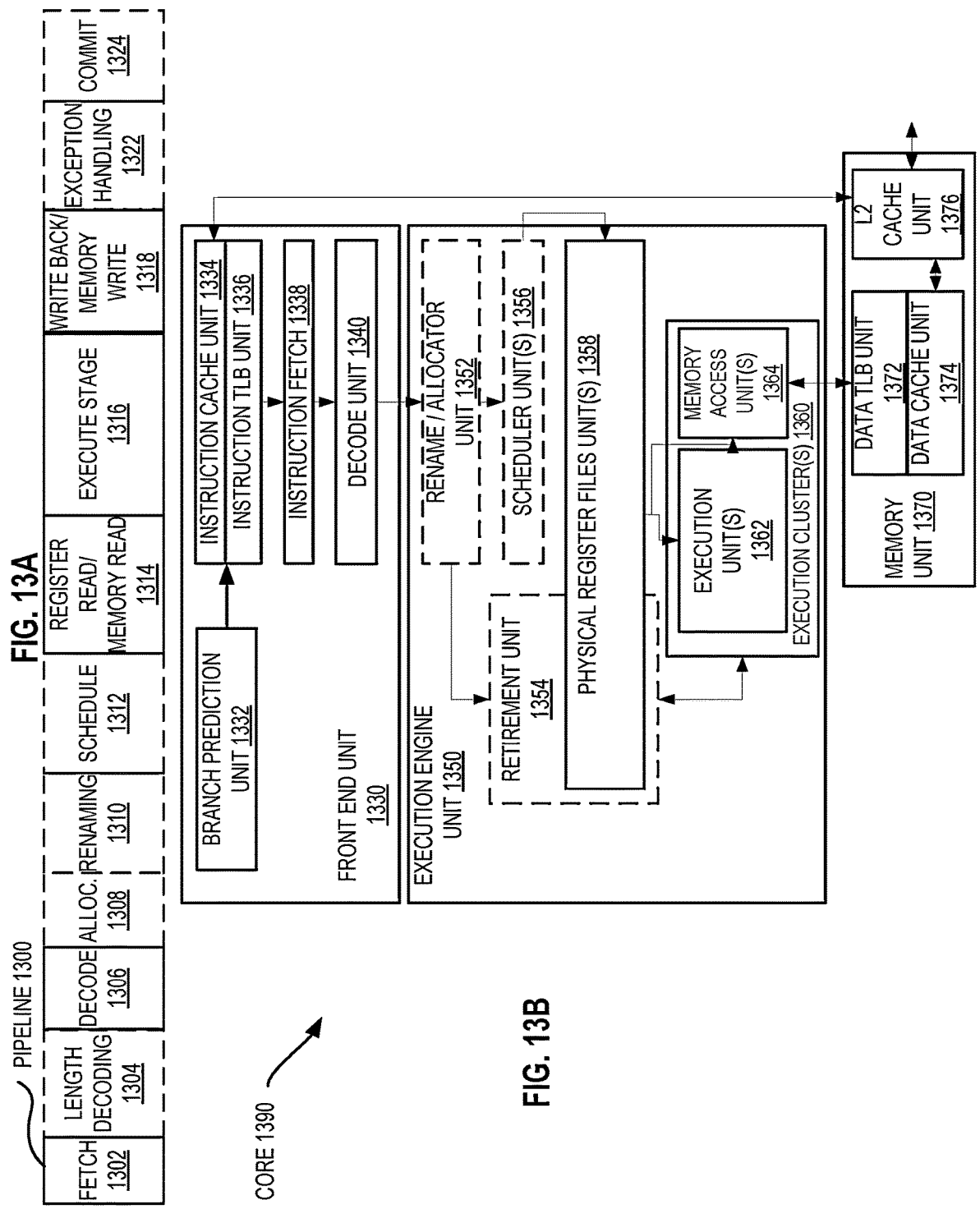

APPARATUSES, METHODS, AND SYSTEMS FOR INSTRUCTIONS TO REQUEST A HISTORY RESET OF A PROCESSOR CORE

CROSS-REFERENCE TO RELATED APPLICATIONS

The present patent application is a continuation of U.S. patent application Ser. No. 17/903,307 filed Sep. 6, 2022, now U.S. Pat. No. 11,645,080, which is a continuation of U.S. patent application Ser. No. 17/124,813 filed Dec. 17, 2020, now U.S. Pat. No. 11,436,018, which claims the benefit of U.S. Provisional Patent Application Ser. No. 62/968,861 filed Jan. 31, 2020, each of which is incorporated herein by reference in its entirety.

TECHNICAL FIELD

The disclosure relates generally to electronics, and, more specifically, an embodiment of the disclosure relates to circuitry to implement an instruction to request a history reset of a processor core.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF DRAWINGS

Various embodiments in accordance with the present disclosure will be described with reference to the drawings, in which:

FIGS. 8A-8D illustrate OS and virtual machine monitor (VMM) support model flow diagrams according to embodiments of the disclosure.

FIG. 11A is a block diagram illustrating fields for the generic vector friendly instruction formats in FIGS. 10A and 10B according to embodiments of the disclosure.

FIG. 11B is a block diagram illustrating the fields of the specific vector friendly instruction format in FIG. 11A that make up a full opcode field according to one embodiment of the disclosure.

FIG. 11C is a block diagram illustrating the fields of the specific vector friendly instruction format in FIG. 11A that make up a register index field according to one embodiment of the disclosure.

FIG. 13A is a block diagram illustrating both an exemplary in-order pipeline and an exemplary register renaming, out-of-order issue/execution pipeline according to embodiments of the disclosure.

FIG. 13B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
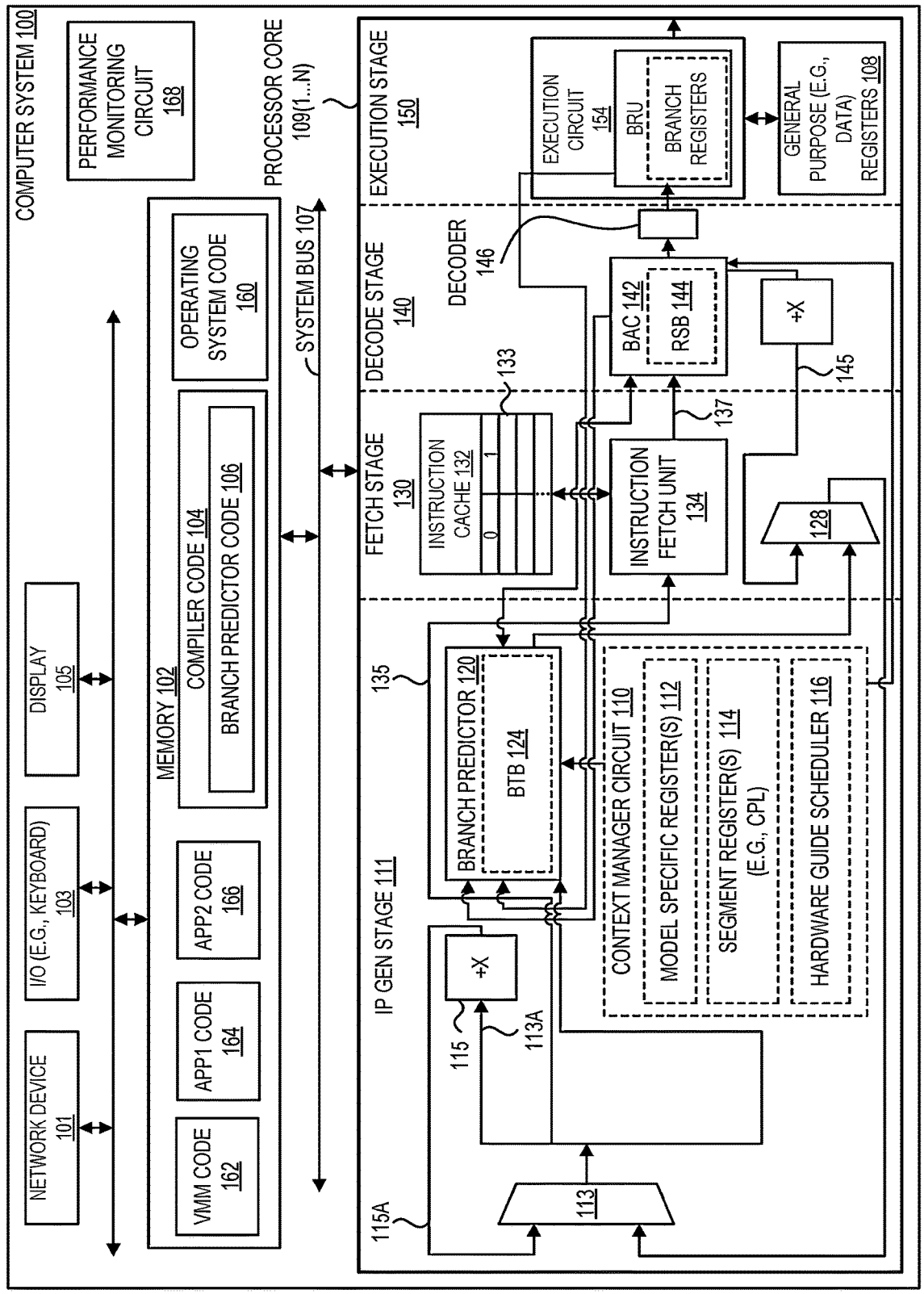
FIG. 1 illustrates a computer system including a processor core according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Software may request execution of a (e.g., software) thread. An operating system (OS) may include a scheduler to schedule execution of (e.g., software) threads on a hardware processor, e.g., on a logical processor (e.g., logical core) of the hardware processor. Each logical processor may be referred to as a respective central processing unit (CPU).

Each thread may have a context. In certain embodiments, contexts are identified by one or more of the following properties: 1) a hardware thread identifier such as a value that identifies one of multiple logical processors (e.g., logical cores) implemented on the same physical core through techniques such as simultaneous multithreading (SMT); 2) a privilege level such as implemented by rings; 3) page table base address or code segment configuration such as implemented in a control register (e.g., CR3) or code segment (CS) register; 4) address space identifiers (ASIDs) such as implemented by Process Context ID (PCID) or Virtual Process ID (VPID) that semantically differentiate the virtual-to-physical mappings in use by the CPU; 5) key registers that contain cryptographically sealed assets (e.g., tokens) used for determination of privilege of the executing software; and/or 6) ephemeral—a context change such as a random reset of context.

Over any non-trivial period of time, many threads (e.g., contexts thereof) may be active within a physical core. In certain embodiments, system software time-slices between applications and system software functions, potentially allowing many contexts access to microarchitectural prediction and/or caching mechanisms.

Certain embodiments herein are directed to a new instruction to indicate a request for history reset (e.g., as part of a context switch) for a physical core (e.g., for specific history type(s) of a CPU/logical processor implemented by the physical core). In certain embodiments, an instruction (e.g., the decoding and executing of that instruction) allows an operating system (OS) to enable a hint into the hardware processor to indicate the hardware should reset its internal history, for example, when a software thread context switch has occurred or as sub run time of software thread. The occurrence of the software thread context switch may thus trigger one or more actions by the hardware (e.g., based on its architecture) and support methods following particular OS configurations.

Certain embodiments herein are directed to a new instruction to (e.g., during a context switch of two threads on a physical core) (e.g., a context switch for a CPU implemented by the physical core) cause a reset of a (e.g., logical) processor's internal history (e.g., as discussed in reference to FIG. 2 below) and/or initialize (e.g., by resetting) a different processor prediction history as a result of the context switch. However, certain processors may be limited to resetting hardware history data for cache data structures (e.g., data caches, instruction caches, and/or translation-lookaside buffers (TLBs)), e.g., via execution of a write-back and invalidate cache (WBINVD) instruction to write back all modified cache lines in the logical processor's internal cache to main memory and invalidate (e.g., flush) the internal caches. In one embodiment, a processor is to write to a control register (e.g., CR3) to reset (e.g., zero out) the content in a TLB and/or execute an instruction to clear (e.g., invalidate) a processor's cache(s).

However, certain hardware processors may not support an instruction that allows for the clearing of history prediction based on runtime execution. It may be undesirable (e.g., for security reasons) that a first (e.g., software) thread has access to information based on a previous execution of a second (or more) thread (e.g., software thread), and this information may include (e.g., software) thread runtime property histories. Thus, it may be desirable that the hardware has knowledge of a context switch of (e.g., software) threads. Certain embodiments herein provide a method to enable an OS to request a history reset, e.g., via execution of an instruction as discussed herein. Certain embodiments herein provide a method to enable an OS to set a hint that a history reset is to occur. Certain embodiments herein explicitly mark a request for a history reset, for example, without execution of an instruction to perform a save of processor state components indicated by the instruction (e.g., XSAVE) and/or an instruction to restore saved processor state components indicated by the instruction (e.g., XRSTOR) (e.g., and the hint to reset the history is set as part of restoring specific context, such as, but not limited to, restoring a value in a model specific register). Certain embodiments herein are directed to an instruction that uses (e.g., separate from context save and restore resources) a model specific register (e.g., as discussed below in reference to FIG. 3) to hint to the hardware about a possible need for a history reset.

Figure 2:
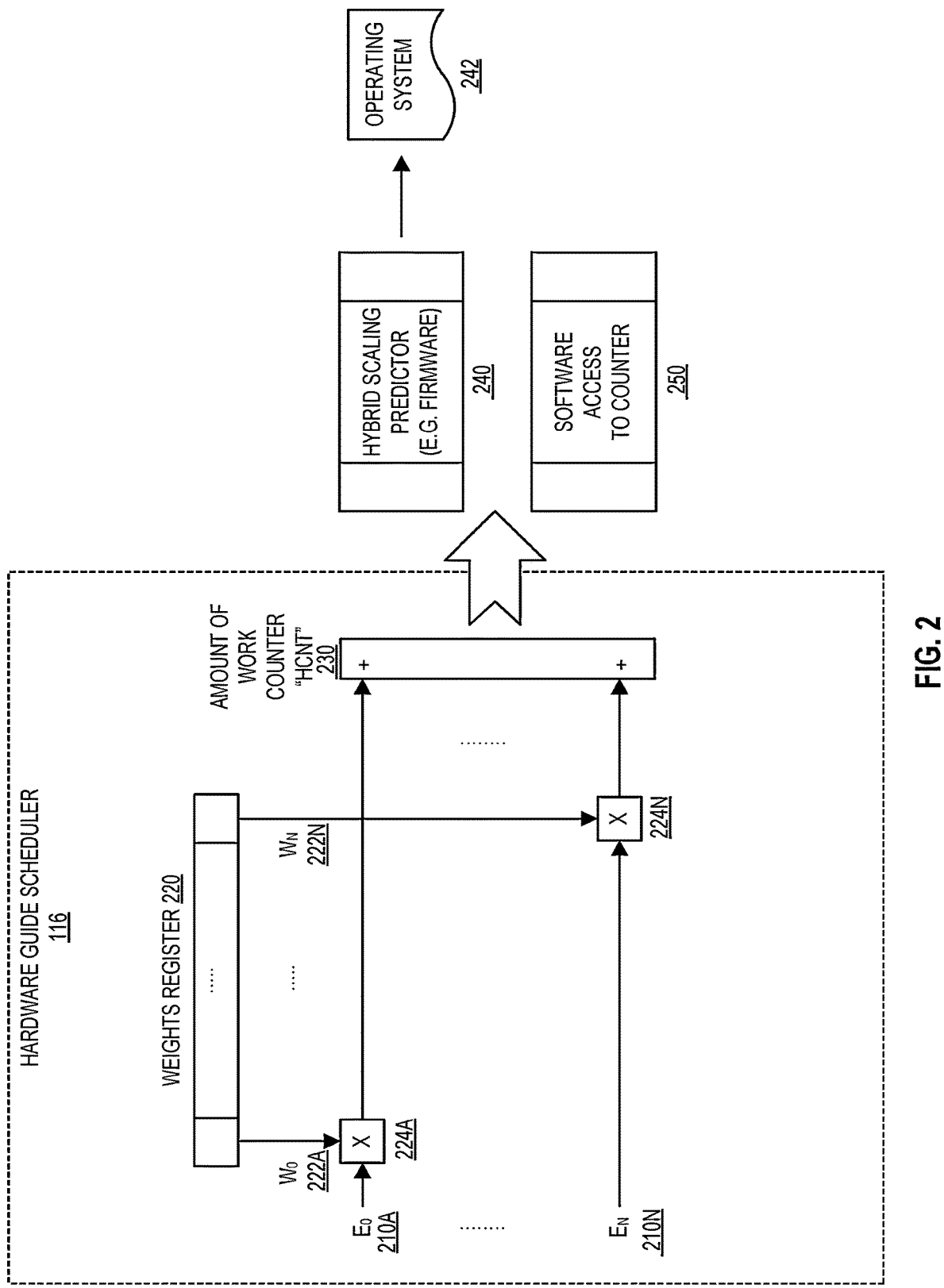
FIG. 2 illustrates hardware guide scheduler according to embodiments of the disclosure.

Certain embodiments herein are directed to an instruction that causes a reset of the processor's internal history, e.g., the instruction for use by an OS in a context switch event. Certain embodiments herein are directed to an instruction that does not write (e.g., buy but may read) a model specific register (and thus avoids any latency caused therefrom). Certain embodiments herein are directed to an instruction that avoids from the OS a different code path as part of the OS scheduler. In certain embodiments, an OS (or virtual machine monitor (VMM)) has the ability to control the possible capabilities of this new instruction (e.g., to clear one or more identified histories, etc.). Example capabilities are resetting of one or more of the prediction histories of a hardware guide scheduler (e.g., as shown in FIG. 2).

Certain embodiments herein are directed to an instruction that causes a history reset for the hardware, e.g., to be used for a software thread context switch event or during runtime of a software thread. Certain embodiments herein can be used in order to enable better alignment into the current running software threads or for a specific part of the running thread into the hardware internal control heuristics. An example for internal history that is reset is a hardware guide scheduler (e.g., period history). It may be desirable to reset a processor's internal history (e.g., the histories used by a hardware guide scheduler) to align the processor optimizations and its control back into the OS for the actual running code (e.g., software thread code). An OS software thread context switch is one of the events that may happen during runtime that changes the current execution code. Another example is a subset of the software thread where it is important to reset previous history (e.g., a hardware guide scheduler's runtime prediction (e.g., microarchitectural) history, before a new part (e.g., a different software thread)

begins to run. Enable the clearing of the history by the hardware can enable better power or performance, to clear historical information that can interfere (e.g., impact the accuracy) between execution of two different software threads, and/or to avoid a security information leak between two different software threads (e.g., or other sensitive software flows).

FIG. 1 illustrates a computer system 100 including a processor core 109 according to embodiments of the disclosure. Processor core 109 includes multiple components (e.g., microarchitectural prediction and caching mechanisms) that may be shared by multiple contexts. For example, branch target buffer (BTB) 124, instruction cache 132, and/or return stack buffer (RSB) 144 may be shared by multiple contexts. Certain embodiments include a context manager circuit 110 to maintain multiple unique states associated with a plurality of contexts simultaneously, and switch active contexts among those tracked by the context manager circuit.

Depicted computer system 100 includes a branch predictor 120 and a branch address calculator 142 (BAC) in a pipelined processor core 109(1)-109(N) according to embodiments of the disclosure. Referring to FIG. 1, a pipelined processor core (e.g., 109(1)) includes an instruction pointer generation (IP Gen) stage 111, a fetch stage 130, a decode stage 140, and an execution stage 150. In one embodiment, computer system 100 includes multiple cores 109(1-N), where N is any positive integer. In another embodiment, computer system 100 includes a single core. In certain embodiments, each processor core 109(1-N) instance supports multithreading (e.g., executing two or more parallel sets of operations or threads on a first and second logical core), and may do so in a variety of ways including time sliced multithreading, simultaneous multithreading (e.g., where a single physical core provides a logical core for each of the threads that physical core is simultaneously multithreading), or a combination thereof (e.g., time sliced fetching and decoding and simultaneous multithreading thereafter). In the depicted embodiment, each single processor core 109(1) to 109(N) includes an instance of branch predictor 120. Branch predictor 120 may include a branch target buffer (BTB) 124.

In certain embodiments, branch target buffer 124 stores (e.g., in a branch predictor array) the predicted target instruction corresponding to each of a plurality of branch instructions (e.g., branch instructions of a section of code that has been executed multiple times). In the depicted embodiment, a branch address calculator (BAC) 142 is included which accesses (e.g., includes) a return stack buffer 144 (RSB). In certain embodiments, return stack buffer 144 is to store (e.g., in a stack data structure of last data in is the first data out (LIFO)) the return addresses of any CALL instructions (e.g., that push their return address on the stack).

Branch address calculator (BAC) 142 is used to calculate addresses for certain types of branch instructions and/or to verify branch predictions made by a branch predictor (e.g., BTB). In certain embodiments, the branch address calculator performs branch target and/or next sequential linear address computations. In certain embodiments, the branch address calculator performs static predictions on branches based on the address calculations.

In certain embodiments, the branch address calculator 142 contains a return stack buffer 144 to keep track of the return addresses of the CALL instructions. In one embodiment, the branch address calculator attempts to correct any improper prediction made by the branch predictor 120 to reduce branch misprediction penalties. As one example, the branch address calculator verifies branch prediction for those branches whose target can be determined solely from the branch instruction and instruction pointer.

In certain embodiments, the branch address calculator 142 maintains the return stack buffer 144 utilized as a branch prediction mechanism for determining the target address of return instructions, e.g., where the return stack buffer operates by monitoring all "call subroutine" and "return from subroutine" branch instructions. In one embodiment, when the branch address calculator detects a "call subroutine" branch instruction, the branch address calculator pushes the address of the next instruction onto the return stack buffer, e.g., with a top of stack pointer marking the top of the return stack buffer. By pushing the address immediately following each "call subroutine" instruction onto the return stack buffer, the return stack buffer contains a stack of return addresses in this embodiment. When the branch address calculator later detects a "return from subroutine" branch instruction, the branch address calculator pops the top return address off of the return stack buffer, e.g., to verify the return address predicted by the branch predictor 120. In one embodiment, for a direct branch type, the branch address calculator is to (e.g., always) predict taken for a conditional branch, for example, and if the branch predictor does not predict taken for the direct branch, the branch address calculator overrides the branch predictor's missed prediction or improper prediction.

The core 109 in FIG. 1 includes circuitry to validate branch predictions made by the branch predictor 120. Each branch predictor 120 entry (e.g., in BTB 124) may further include a valid field and a bundle address (BA) field which are used to increase the accuracy and validate branch predictions performed by the branch predictor 120, as is discussed in more detail below. In one embodiment, the valid field and the BA field each consist of one-bit fields. In other embodiments, however, the size of the valid and BA fields may vary. In one embodiment, a fetched instruction is sent (e.g., by BAC 142 from line 137) to the decoder 146 to be decoded, and the decoded instruction is sent to the execution circuit (e.g., unit) 154 to be executed.

Depicted computer system 100 includes a network device 101, input/output (I/O) circuit 103 (e.g., keyboard), display 105, and a system bus (e.g., interconnect) 107.

In one embodiment, the branch instructions stored in the branch predictor 120 are pre-selected by a compiler as branch instructions that will be taken. In certain embodiments, the compiler code 104, as shown stored in the memory 102 of FIG. 1, includes a sequence of code that, when executed, translates source code of a program written in a high-level language into executable machine code. In one embodiment, the compiler code 104 further includes additional branch predictor code 106 that predicts a target instruction for branch instructions (for example, branch instructions that are likely to be taken (e.g., pre-selected branch instructions)). The branch predictor 120 (e.g., BTB 124 thereof) is thereafter updated with a target instruction for a branch instruction. In one embodiment, software manages a hardware BTB, e.g., with the software specifying the prediction mode or with the prediction mode defined implicitly by the mode of the instruction that writes the BTB also setting a mode bit in the entry.

Memory 102 may include operating system (OS) code 160, virtual machine monitor (VMM) code 162, first application (e.g., program) code 164, second application (e.g., program) code 166, or any combination thereof. In embodiments of computing, a virtual machine (VM) is an emulation of a computer system. In certain embodiments, VMs are based on a specific computer architecture and provide the functionality of an underlying physical computer system. Their implementations may involve specialized hardware, firmware, software, or a combination. In certain embodiments, Virtual Machine Monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain embodiments. When installed over a host machine (e.g., processor) in certain embodiments, a VMM facilitates the creation of VMs, e.g., each with separate operating systems (OS) and applications. The VMM may manage the backend operation of these VMs by allocating the necessary computing, memory, storage and other input/output (I/O) resources, such as, but not limited to, an input/output memory management unit (IOMMU). The VMM may provide a centralized interface for managing the entire operation, status and availability of VMs that are installed over a single host machine or spread across different and interconnected hosts.

As discussed below, depicted core (e.g., branch predictor 120 thereof) includes access to one or more registers. In certain embodiments, core include one or more general purpose register(s) 108.

In certain embodiments, each entry for the branch predictor 120 (e.g., in BTB 124 thereof) includes a tag field and a target field. In one embodiment, the tag field of each entry in the BTB stores at least a portion of an instruction pointer (e.g., memory address) identifying a branch instruction. In one embodiment, the tag field of each entry in the BTB stores an instruction pointer (e.g., memory address) identifying a branch instruction in code. In one embodiment, the target field stores at least a portion of the instruction pointer for the target of the branch instruction identified in the tag field of the same entry. Moreover, in other embodiment, the entries for the branch predictor 120 (e.g., in BTB 124 thereof) includes one or more other fields. In certain embodiments, an entry does not include a separate field to assist in the prediction of whether the branch instruction is taken, e.g., if a branch instruction is present (e.g., in the BTB), it is considered to be taken.

As shown in FIG. 1, the IP Gen mux 113 of IP generation stage 111 receives an instruction pointer from line 115A. The instruction pointer provided via line 115A is generated by the incrementer circuit 115, which receives a copy of the most recent instruction pointer from the path 113A. The incrementer circuit 115 may increment the present instruction pointer by a predetermined amount, to obtain the next sequential instruction from a program sequence presently being executed by the core.

In one embodiment, upon receipt of the IP from IP Gen mux 113, the branch predictor 120 compares a portion of the IP with the tag field of each entry in the branch predictor 120 (e.g., BTB 124). If no match is found between the IP and the tag fields of the branch predictor 120, the IP Gen mux will proceed to select the next sequential IP as the next instruction to be fetched in this embodiment. Conversely, if a match is detected, the branch predictor 120 reads the valid field of the branch predictor entry which matches with the IP. If the valid field is not set (e.g., has a logical value of 0) the branch predictor 120 considers the respective entry to be "invalid" and will disregard the match between the IP and the tag of the respective entry in this embodiment, e.g., and the branch target of the respective entry will not be forwarded to the IP Gen Mux. On the other hand, if the valid field of the matching entry is set (e.g., has a logical value of 1), the branch predictor 120 proceeds to perform a logical comparison between a predetermined portion of the instruction pointer (IP) and the branch address (BA) field of the matching branch predictor entry in this embodiment. If an "allowable condition" is present, the branch target of the matching entry will be forwarded to the IP Gen mux, and otherwise, the branch predictor 120 disregards the match between the IP and the tag of the branch predictor entry. In some embodiment, the entry indicator is formed from not only the current branch IP, but also at least a portion of the global history.

More specifically, in one embodiment, the BA field indicates where the respective branch instruction is stored within a line of cache memory 132. In certain embodiments, a processor is able to initiate the execution of multiple instructions per clock cycle, wherein the instructions are not interdependent and do not use the same execution resources.

For example, each line of the instruction cache 132 shown in FIG. 1 includes multiple instructions (e.g., six instructions). Moreover, in response to a fetch operation by the fetch unit 134, the instruction cache 132 responds (e.g., in the case of a "hit") by providing a full line of cache to the fetch unit 134 in this embodiment. The instructions within a line of cache may be grouped as separate "bundles." For example, as shown in FIG. 1, the first three instructions in a cache line 133 may be addressed as bundle 0, and the second three instructions may be addressed as bundle 1. Each of the instructions within a bundle are independent of each other (e.g., can be simultaneously issued for execution). The BA field provided in the branch predictor 120 entries is used to identify the bundle address of the branch instruction which corresponds to the respective entry in certain embodiments. For example, in one embodiment, the BA identifies whether the branch instruction is stored in the first or second bundle of a particular cache line.

In one embodiment, the branch predictor 120 performs a logical comparison between the BA field of a matching entry and a predetermined portion of the IP to determine if an "allowable condition" is present. For example, in one embodiment, the fifth bit position of the IP (e.g. IP[4]) is compared with the BA field of a matching (e.g., BTB) entry. In one embodiment, an allowable condition is present when IP [4] is not greater than the BA. Such an allowable condition helps prevent the apparent unnecessary prediction of a branch instruction, which may not be executed. That is, when less than all of the IP is considered when doing a comparison against the tags of the branch predictor 120, it is possible to have a match with a tag, which may not be a true match. Nevertheless, a match between the IP and a tag of the branch predictor indicates a particular line of cache, which includes a branch instruction corresponding to the respective branch predictor entry, may about to be executed. Specifically, if the bundle address of the IP is not greater than the BA field of the matching branch predictor entry, then the branch instruction in the respective cache line is soon to be executed. Hence, a performance benefit can be achieved by proceeding to fetch the target of the branch instruction in certain embodiments.

As discussed above, if an "allowable condition" is present, the branch target of the matching entry will be forwarded to the IP Gen mux in this example. Otherwise, the branch predictor will disregard the match between the IP and the tag. In one embodiment, the branch target forwarded from the branch predictor is initially sent to a Branch Prediction (BP) resteer mux 128, before it is sent to the IP Gen mux. The BP resteer mux 128, as shown in FIG. 1, may also receive instruction pointers from other branch prediction devices. In one embodiment, the input lines received by the BP resteer mux will be prioritized to determine which input line will be allowed to pass through the BP resteer mux onto the IP Gen mux.

In addition to forwarding a branch target to the BP resteer mux, upon detecting a match between the IP and a tag of the branch predictor, the BA of the matching branch predictor entry is forwarded to the Branch Address Calculator (BAC) 142. The BAC 142 is shown in FIG. 1 to be located in the decode stage 140, but may be located in other stage(s). The BAC may also receive a cache line from the fetch unit 134 via line 137.

The IP selected by the IP Gen mux is also forwarded to the fetch unit 134, via data line 135 in this example. Once the IP is received by the fetch unit 134, the cache line corresponding to the IP is fetched from the instruction cache 132. The cache line received from the instruction cache is forwarded to the BAC, via data line 137.

Upon receipt of the BA in this example, the BAC will read the BA to determine where the pre-selected branch instruction (e.g., identified in the matching branch predictor entry) is located in the next cache line to be received by the BAC (e.g., the first or second bundle of the cache line). In one embodiment, it is predetermined where the branch instruction is located within a bundle of a cache line (e.g., in a bundle of three instructions, the branch instruction will be stored as the second instruction).

In alternative embodiments, the BA includes additional bits to more specifically identify the address of the branch instruction within a cache line. Therefore, the branch instruction would not be limited to a specific instruction position within a bundle.

After the BAC determines the address of the pre-selected branch instruction within the cache line, and has received the respective cache line from the fetch unit 134, the BAC will decode the respective instruction to verify the IP truly corresponds to a branch instruction. If the instruction addressed by BA in the received cache line is a branch instruction, no correction for the branch prediction is necessary. Conversely, if the respective instruction in the cache line is not a branch instruction (i.e., the IP does not correspond to a branch instruction), the BAC will send a message to the branch predictor to invalidate the respective branch predictor entry, to prevent similar mispredictions on the same branch predictor entry. Thereafter, the invalidated branch predictor entry will be overwritten by a new branch predictor entry.

In addition, in one embodiment, the BAC will increment the IP by a predetermined amount and forward the incremented IP to the BP resteer mux 128, via data line 145, e.g., the data line 145 coming from the BAC will take priority over the data line from the branch predictor. As a result, the incremented IP will be forwarded to the IP Gen mux and passed to the fetch unit in order to correct the branch misprediction by fetching the instructions that sequentially follow the IP.

In certain embodiments, the context manager circuit 110 allows one or more of the above discussed shared components to be utilized by multiple contexts, e.g., while alleviating information being leaked across contexts by directly or indirectly observing the information stored. Computing system 100 (e.g., core 109) may include a control register (e.g., model specific register(s) 112 (e.g., MSR discussed below in reference to FIG. 3)), a segment register 114 (e.g., indicating the current privilege level), a hardware guide scheduler 116 (e.g., as discussed below in reference to FIG. 2), or any combination thereof. Segment register 114 may store a value indicating a current privilege level of software operating on a logical core, e.g., separately for each logical core. In one embodiment, current privilege level is stored in a current privilege level (CPL) field of a code segment selector register of segment register 114. In certain embodiments, processor core 109 requires a certain level of privilege to perform certain actions, for example, actions requested by a particular logical core (e.g., actions requested by software running on that particular logical core). An instance of a hardware guide scheduler 116 may be in each core 109(1-N) of computer system 100 (e.g., for each logical processor implemented by a core). A single instance of a hardware guide scheduler 116 may be anywhere in computer system 100, e.g., a single instance of hardware guide scheduler used for all cores 109(1-N) present.

In one embodiment, model specific registers 112 include configuration and/or control registers. In one embodiment, control registers are separate/distinct from model specific registers. In one embodiment, one or more (e.g., model specific) registers are (e.g., only) written to at the request of the OS running on the processor, e.g., where the OS operates in privileged (e.g., system) mode, but not for code running in non-privileged (e.g., user) mode. In one embodiment, a model specific register can only be written to by software running in supervisor mode, and not by software running in user mode.

In certain embodiments, decoder 146 decodes an instruction according to this disclosure, and that decoded instruction is executed by the execution circuit 154, for example, to reset a plurality of software thread runtime property histories, e.g., of hardware guide scheduler 116.

Computer system 100 may include a performance monitoring circuit 168, e.g., including any number of performance counters therein to count, monitor, and/or log events, activity, and/or other measure related to performance. In various embodiments, performance counters may be programmed by software running on a core to log performance monitoring information. For example, any of performance counters may be programmed to increment for each occurrence of a selected event, or to increment for each clock cycle during a selected event. The events may include any of a variety of events related to execution of program code on a core, such as branch mispredictions, cache hits, cache misses, translation lookaside buffer hits, translation lookaside buffer misses, etc. Therefore, performance counters may be used in efforts to tune or profile program code to improve or optimize performance.

Each core 109 of computer system 100 may be the same (e.g., symmetric cores) or a proper subset of one or more of the cores may be different than the other cores (e.g., asymmetric cores). In one embodiment, a set of asymmetric cores includes a first type of core (e.g., a lower power core) and a second, higher performance type of core (e.g., a higher power core).

In certain embodiments, a computer system includes multiple cores that all execute a same instruction set architecture (ISA). In certain embodiments, a computer system includes multiple cores, each having an instruction set architecture (ISA) according to which it executes instructions issued or provided to it and/or the system by software. In this specification, the use of the term "instruction" may generally refer to this type of instruction (which may also be called a macro-instruction or an ISA-level instruction), as opposed to: (1) a micro-instruction or micro-operation that may be provided to execution and/or scheduling hardware as a result of the decoding (e.g., by a hardware instruction-decoder) of a macro-instruction, and/or (2) a command, procedure, routine, subroutine, or other software construct, the execution and/or performance of which involves the execution of multiple ISA-level instructions.

In some such systems, the system may be heterogeneous because it includes cores that have different ISAs. A system may include a first core with hardware, hardwiring, microcode, control logic, and/or other micro-architecture designed to execute particular instructions according to a particular ISA (or extensions to or other subset of an ISA), and the system may also include a second core without such micro-architecture. In other words, the first core may be capable of executing those particular instructions without any translation, emulation, or other conversion of the instructions (except the decoding of macro-instructions into micro-instructions and/or micro-operations), whereas the second core is not. In that case, that particular ISA (or extensions to or subset of an ISA) may be referred to as supported (or natively supported) by the first core and unsupported by the second core, and/or the system may be referred to as having a heterogeneous ISA.

In other such systems, the system may be heterogeneous because it includes cores having the same ISA but differing in terms of performance, power consumption, and/or some other processing metric or capability. The differences may be provided by the size, speed, and/or microarchitecture of the core and/or its features. In a heterogeneous system, one or more cores may be referred to as "big" because they are capable of providing, they may be used to provide, and/or their use may provide and/or result in a greater level of performance (e.g., greater instructions per cycle (IPC)), power consumption (e.g., less energy efficient), and/or some other metric than one or more other "small" or "little" cores in the system.

In these and/or other heterogeneous systems, it may be possible for a task to be performed by different types of cores. Furthermore, it may be possible for a scheduler (e.g., a hardware scheduler of a software scheduler of an operating system executing on the processor) to schedule or dispatch tasks to different cores and/or migrate tasks between/among different cores (generally, a "task scheduler"). Therefore, efforts to optimize, balance, or otherwise affect throughput, wait time, response time, latency, fairness, quality of service, performance, power consumption, and/or some other measure on a heterogeneous system may include task scheduling decisions.

For example, if a particular task is mostly stalled due to long latency memory accesses, it may be more efficient to schedule it on a small core and save power of an otherwise bigger core. On the other hand, heavy tasks may be scheduled on a big core to complete the compute sooner, e.g., and let the system go into sleep/idle sooner. Due to the diversity of workloads a system (e.g., a client) can perform, the dynamic characteristics of a workload, and conditions of the system itself, it might not be straightforward for a pure software solution to make such decisions. Therefore, the use of embodiments herein (e.g., of a hardware guide scheduler) may be desired to provide information upon which such decisions may be based, in part or in full. Furthermore, the use of these embodiments may be desired in efforts to optimize and/or tune applications based on the information that may be provided.

Embodiments may also or instead provide for other desired benefits, such as enabling predictions of performance scores based on the dynamic characteristics of a system, eliminating a need to run a workload on each core to measure its amount of work by providing ISA-level counters (e.g., number of load instructions) that may be shared among various cores, and lowering the hardware implementation costs of performance monitoring by providing a single counter based on multiple performance monitoring events.

A processor may include a hardware guide scheduler that is shared by multiple contexts (and/or cores), e.g., as discussed further below in reference to FIG. 2.

A processor may contain other shared structures dealing with state including, for example, prediction structures, caching structures, a physical register file (renamed state), and buffered state (a store buffer). Prediction structures, such as branch predictors or prefetchers, may store state about past execution behavior that is used to predict future behavior. A processor may use these predictions to guide speculation execution, achieving performance that would not be possible otherwise. Caching structures, such as caches or TLBs, may keep local copies of shared state so as to make accesses by the processor very fast.

Shared structures are a security risk. Information can be leaked across contexts by directly or indirectly observing the information stored. Further, behavior in a victim context can be influenced by training from within an attacking context. The disclosure herein alleviates some of these problems in certain embodiments.

FIG. 2 illustrates hardware guide scheduler 116 according to embodiments of the disclosure. Hardware guide scheduler 116 (and/or hybrid scaling predictor 240) may be implemented in logic gates and/or any other type of circuitry, all or parts of which may be included in a discrete component and/or integrated into the circuitry of a processing device or any other apparatus in a computer or other information processing system, for example, implemented in a core (such as core 109 in FIG. 1) and/or a system agent (such as system agent 1510 in FIG. 15 or FIG. 19) in a heterogeneous SoC, (such as a heterogeneous instance of SoC 1900 in FIG. 19). A guide scheduler may be implemented by firmware code.

In FIG. 2, each of any number of unweighted event counts (shown as $E_0$ 210A to $E_N$ 210N) represents an unweighted event count or any other output of a performance counter (generally, each an "unweighted event count"), such as any performance counters in performance monitoring circuit 168 of FIG. 1. In various embodiments, $E_0$ 210A to $E_N$ 210N may represent a set of any number of unweighted event counts including any number of subsets of unweighted event counts from different cores. For example, the unweighted event counts may be from performance counters all in one core, from one or more performance counters in a first core plus one or more performance counters in a second core, from one or more performance counters in a first core plus one or more performance counters in a second core plus one or more performance counters in a third core, and so on. Furthermore, any one of more of the event counts (e.g., $E_0$ 210A to $E_N$ 210N) may represent an output of (e.g., feedback from) an active runtime (e.g., work) counter, such as work counter 230 (as described below), as in an embodiment in which a hierarchical arrangement of performance and work counters is implemented (note that in such an embodiment, an event count may be referred to as an unweighted event count, even though it may have been generated by a work counter based on weighted event counts).

In FIG. 2, weights register 220 represents a programmable or configurable register or other storage location (or combination of storage locations), to store any number of weight values (shown as $w_0$ 222A to $w_N$ 222N), each weight value corresponding to one of the unweighted event counts and to be used by a corresponding weighting unit (shown as weighting units 224A to 224N) to weight the corresponding unweighted event count and generate a weighted event count. The weight values may be a tuned set of values. For example, software or firmware may assign a weight value of 1 to $E_0$ and a weight value of 2 to $E_N$, in which case weighting unit 224A may weight (e.g., scale or multiply) $E_0$ by a factor of 1 and weighting unit 224N may weight (e.g., scale or multiply) $E_N$ by a factor of 2. In various embodiments, any weight values (including 0), range of weight values, and/or weighting approach (e.g., multiplying, dividing, adding, etc.) may be used. In various embodiments, implementations of a weights register and/or weighting units may limit the choice of weight values to one of a number of possible weight values.

In FIG. 2, weighted event counts (shown as the outputs of weighting units 224A to 224N) are received for processing by a work counter (shown as heterogenous (e.g., hybrid) counter (HCNT) 230, but may be used for homogenous or heterogenous processors/systems). In an embodiment, the processing of weighted event counts may include summing the weighted event counts to generate a measure of an amount of work (generally, a "measured work amount"). Various embodiments may provide for this measured work amount to be based on a variety of performance measurements or other parameters, each scaled or manipulated in a variety of ways, and to be used for a variety of purposes. In an embodiment, a work counter may be used to provide a dynamic profile of the current workload.

For example, HCNT 230 may be used to generate a weighted sum of various classes of performance monitoring events that can be dynamically estimated by all cores in a system (e.g., SoC). HCNT 230 may be used to predict a hardware guide scheduler (HGS) class, e.g., HCNT 230 may be used as a source for hybrid scaling predictor 240 and/or for any software 250 having access to HCNT 230. The events may be sub-classes of an ISA (e.g., AVX floating-point, AVX2 integer), special instructions (e.g. repeat string), or categories of bottlenecks (e.g., front-end bound from top-down analysis). The weights may be chosen to reflect a type of execution code (e.g., memory stalls or branching code) and/or a performance ratio (e.g., 2 for an instruction class that executes twice as fast on a big core and 1 for all other instruction classes), a scalar of amount of work (e.g., 2 for fused-multiply instructions), etc.

Certain embodiments provide for any of a variety of events to be counted and/or summed, including events related to arithmetic floating-point (e.g., 128-bit) vector instructions, arithmetic integer (e.g., 256-bit) vector instructions, arithmetic integer vector neural network instructions, load instructions, store instructions, repeat strings, top-down micro-architectural analysis (TMA) level 1 metrics (e.g., front-end bound, back-end bound, bad speculation, retiring), and/or any performance monitoring event counted by any counter.

In addition to a work counter according to an embodiment of the disclosure, FIG. 2 illustrates a representation of usages of a work counter according to embodiments of the disclosure, including by a hybrid scaling predictor 240 and/or by any software 250 having access to the work counter. In an embodiment, hybrid scaling predictor 240 may be implemented in hardware or firmware, may provide information (for example, direct or indirect information, e.g., by enabling range of indexes based on the counter values) to an OS 242, and/or may be used to predict performance scaling (e.g., between big and little cores), e.g., by providing a hint based on the history to the hardware (e.g., via writing to an MSR that is read by the OS).

In an embodiment, a work counter may be used to provide hints (e.g., written into an MSR) to an operating system running on a heterogeneous (e.g., or homogenous) SoC or system, where the hints may provide for task scheduling that may improve performance and/or quality of service. For example, a homogeneous system including one or more instances of the same core for use in optimal multicore thread scheduling. For example, a heterogeneous client system including one or more big cores and one more little cores may be used to run an artificial intelligence (AI) application (e.g., a machine learning model) including a particular class of instructions that may speed up processing of the type of instructions typically used in the AI application, e.g., particularly or only if executed on a big core. The use of a work counter programmed to monitor execution of this class of instruction may provide hints to an OS to guide the OS to schedule threads including these instructions on big cores instead of little cores, thereby improving performance and/or quality of service.

In certain embodiments, the weight values are programmable to provide for tuning of the weights (e.g., in a lab) based on actual results. In embodiments, one or more weights of zero may be used to disconnect a particular event or class of events. In embodiments, one of more weights of zero may be used for isolating various components that feed into a work counter. Embodiments herein may support an option for hardware and/or software (e.g., an OS) to enable/disable a work counter for any of a variety of reasons, for example, to avoid power leakage when the work counter is not in use.

In one embodiment, a scheduler of operating system code (e.g., OS code 160 in FIG. 1) uses hardware guide scheduler 116 (and/or hybrid scaling predictor 240) to select the best core (e.g., type) (or other component) to be used to execute a thread for a software thread, e.g., a software thread of first application code (e.g., first application code 164 in FIG. 1) or second application code (e.g., second application code 166 in FIG. 1).

Software thread runtime property histories (e.g., including the weight values and/or HCNT counter values discussed herein) may be useful for a first software thread but not for a following second software thread. Thus, certain embodiments herein provide an instruction (and method) to clear the software thread runtime property histories on a context switch (e.g., a switch from the first software thread to the second software thread). For example, clearing the HCNT counter current value (e.g., and thus the impact of this value of the full prediction flow). For example, clearing the current values of the counters E0 . . . En and/or HCNT 230 in FIG. 2.

In one embodiment, the instruction mnemonic is "HRESET" but for other embodiments, it can be another mnemonic. The usage opcode of HRESET can include an immediate operand, other types of operands, or zero explicit operands (e.g., defined without use of any operand). In one embodiment, the hardware (e.g., processor core) ignores any immediate operand value (e.g., without causing an exception (e.g., fault)) and/or any request specific setting. It should be understood that other embodiments may utilize an immediate operand value (e.g., such that is reserved for other uses). In another embodiment where the instruction includes an immediate operand, it is possible to define that this immediate operand will include only zero (e.g., or cause an exception (e.g., fault) otherwise when executing the instruction). Other operand values may not be supported, and an incorrect setting can generate an exception like Invalid Opcode (e.g., UnDefined Opcode or General Protection Fault).

In one embodiment, an instruction is to ignore an explicit (e.g., immediate) operand, while its implicit operand (e.g., not explicitly specified in a field of the instruction) may be a general purpose register (e.g., EAX register) (e.g., of general purpose registers 108 in FIG. 1) (e.g., to enable 32 options of bit mask configuration). Another option is to define the instruction without an explicit immediate operand and in this case a valid use may be indicated by the opcode (e.g., corresponding to the mnemonic of HRESET), for example, while its implicit operand (e.g., not explicitly specified in a field of the instruction) may be a general purpose register (e.g., EAX register) (e.g., of general purpose registers 108 in FIG. 1). In certain embodiments, the implicit operand is a single register (e.g., EAX) or a concatenation of a plurality of registers (e.g., EAX:EDX is to concatenate the contents of register EAX followed by the contents of register EDX (e.g., to enable 64 options of bit mask configuration)).

In certain embodiments, an instruction utilizes a new opcode (e.g., not a legacy opcode of a legacy instruction), for example, such that hardware that does not support this instruction will not be able to execute it (e.g., and the exception undefined instruction will happen in a case like this). In certain embodiments, use of this instruction may include that software (e.g., an OS) is to check if the hardware supports execution of this instruction before scheduling execution of the instruction. In one embodiment, the software is to check if the hardware supports execution of the instruction be executing a check (e.g., having a mnemonic of CPUID) instruction feature bit setting.

In certain embodiments, execution of the instruction is only allowed for a certain privilege level (for example, supervisor level (e.g., ring 0) and/or user level (e.g., ring 3)). In an embodiment where the instruction is limited only to be used by supervisor level (e.g., an OS) (e.g., in ring 0 only), request for execution of the instruction for user level (e.g., a user application) generates an exception, e.g., a general-protection exception.

Certain embodiments herein define a new instruction where the OS is able to select the components of the processor to be cleared (e.g., to (e.g., only) clear one or more logical processor's histories) (e.g., to (e.g., only) clear one or more of software thread runtime property histories). In one embodiment, the instruction includes a control parameter to enable software (e.g., the OS) to control in runtime the exact history reset supported (e.g., in a much faster method over writing into an MSR). In certain embodiments, the control of the new instruction is done by the instruction's parameters (e.g., a data register that enables 32-bit control options and/or a set of data registers that enables 64-bit control options). In certain embodiments, an instruction also defines OS control (e.g., opt-in) on the support capabilities of the instruction. In certain embodiments, an instruction takes an implicit operand (e.g., EAX) or an explicit operand.

In an embodiment where the instruction is supported in user mode (e.g., ring 3), the OS may have the ability to control and opt-in what capabilities (e.g., of a plurality of capabilities) that the instruction include and/or what type of history this instruction can reset and in which way. In order to support this, in certain embodiments an OS assist (e.g., an OS system call of an application programming interface (API)) can be requested, and used to enable the instruction for user level code, indicate which reset (e.g., HRESET) support capabilities were enabled by the OS (e.g., and supported by the hardware), and/or used to control any reset (e.g., HRESET) instruction parameters (e.g., in supervisor level).

Figure 4:
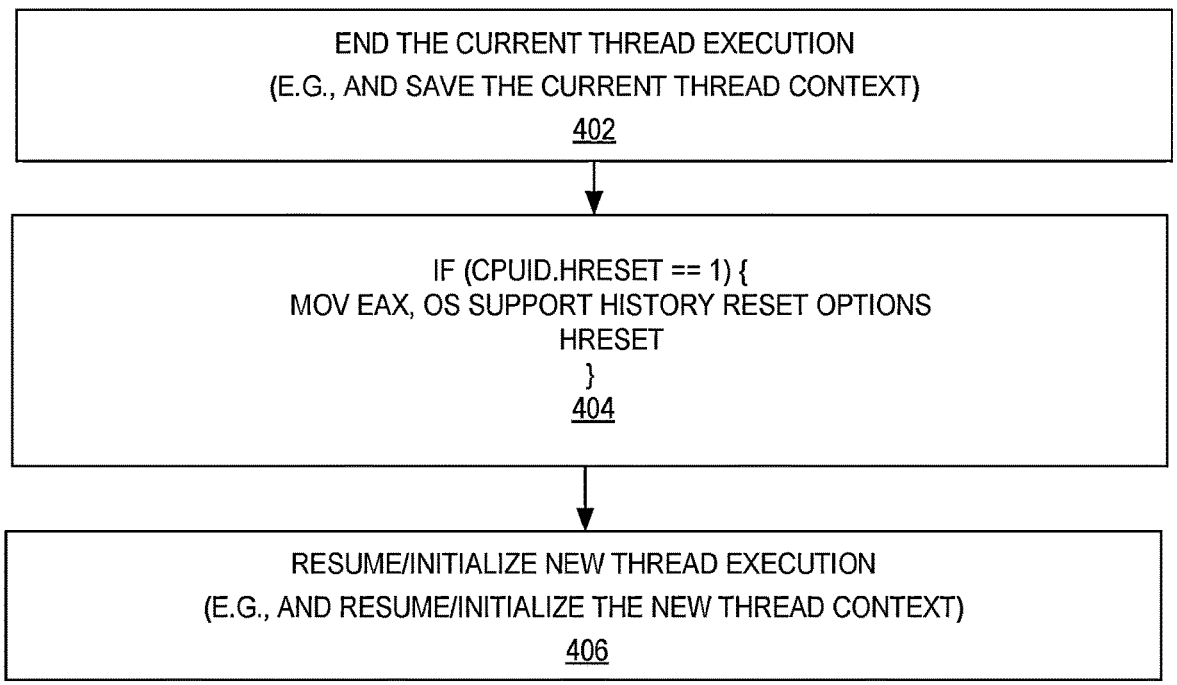
FIG. 4 illustrates an operating system (OS) scheduler control flow diagram according to embodiments of the disclosure.
Figure 5:
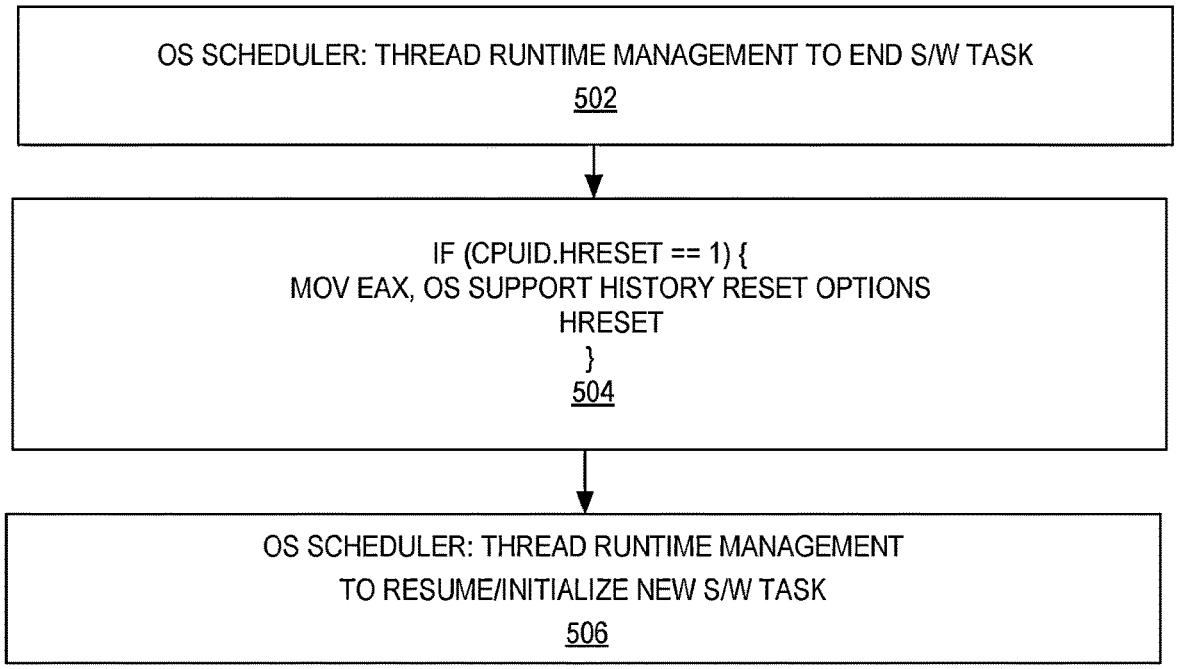
FIG. 5 illustrates an application level control flow diagram according to embodiments of the disclosure.

In one embodiment, an OS sets this new instruction as part of an OS scheduler runtime support, e.g., for a context switch flow (e.g., as shown in FIG. 4) or as part of a thread in runtime support that can control different types of thread task (e.g., as shown in FIG. 5). In certain embodiments, the instruction is defined with a new opcode so the software (e.g., OS) is to first check if the hardware supports this instruction and what are the capabilities of it before this instruction is able to be used. Thus, in one embodiment, a different code path is defined by the software to support this new instruction. For example, with the checking if the hardware supports the instruction performed by reading (e.g., CPUID) feature bit(s) to determine if the hardware supports this new instruction. In one embodiment, the software is to use this new instruction only if the hardware supports it as indicated by its enumeration method.

In one embodiment of a processor, execution is done in a speculative way. In order to avoid speculative history reset, it is possible that while the (e.g., HRESET) instruction is executed for a history reset (e.g., while all the checks to reset the history have happened, but before the history reset itself has happened), it will take an action as a pre-serialized action instruction, e.g., where all prior (in program order) instructions have completed locally before the history reset is done. In one embodiment, HRESET is used to avoid a history leak, e.g., in a core that executes instructions out of program order. Another possible support option is to enable pre-serialization instruction to support only on a subset of the history reset types that can be affected from the processor speculative execution method. In yet another option, the instruction is supported as a serialized. It is also possible to define the support as a serialized instruction only for specific HRESET capabilities and only when these HRESET capabilities are enabled to be in use. For example, options to select a pre-serialized instruction support method or a serialized instruction support method for a proper subset of history reset types may be used to limit any negative performance side effect of the pre-serialized or the serialized instruction support, e.g., where all prior (e.g., in program order) instructions have completed locally before the history reset is performed.

In one embodiment, a new reset (e.g., HRESET) instruction includes a model specific register (MSR) (e.g., that the OS uses) in order to enable the different support features. In one embodiment, as a default, all of the support features are disabled. In one embodiment, the OS is to enable a subset or all of the support features. In one embodiment, only the lower (e.g., 32) proper subset of bits are allocated for HRESET usage. An example definition of this MSR is shown in FIG. 3.

Figure 3:
FIG. 3 illustrates an example format of a model specific register for a processor internal history reset according to embodiments of the disclosure.

FIG. 3 illustrates an example format 300 of a model specific register for a processor internal history reset according to embodiments of the disclosure. Depicted format includes a first bit (e.g., bit position zero) for enable bit 302 (e.g., such that setting of the bit 302 to a first value (e.g., one) turns on the reset functionality and setting of the bit 302 to a second value (e.g., zero) turns off the reset functionality). In one embodiment, the reset is of software thread runtime property histories, e.g., only for a reset request made in supervisor mode. The other bits 304 may be used to indicate other capabilities of the instruction. Optionally, other components may have their history cleared, e.g., as indicated by the setting of a respective bit in the other bits 304 (e.g., bits 63:1 for 64 bit mode and bits 31:1 for 32 bit mode) respectively.

In one embodiment, the IA32_HRESET_ENABLE MSR is a read/write MSR and is structured as follows: bit 0—Enables reset of the enhanced hardware feedback interface (EHFI) history (e.g., accumulated history) (e.g., HGS or HGS plus) when set to one, bits 31:1—Reserved for other capabilities that can be reset by the HRESET instruction, and (optional) bits 63:32—Reserved. In one embodiment, an operating system sets IA32_HRESET_ENABLE[bit 0] to enable EHFI history reset via the HRESET instruction.

In one embodiment, to enable a HRESET instruction to turn on pre-serialized support (e.g., only) when all of the reset history conditions have happened, the instruction is to request that a write of the (e.g., IA32_HRESET_ENABLE) MSR will be completed before any speculation part of the HRESET instruction will be able to be executed. In one embodiment, to enable this, a WRMSR (e.g., microcode) operation (e.g., to write to the MSR) of a (e.g., IA32_HRESET) instruction is defined as a serialized operation.

In certain embodiments, the new (e.g., HRESET) instruction enables an OS to reset a hardware guide scheduler's (HGS or HGS plus) history as a result of execution of the instruction. The list of capabilities can be increased with other options like resetting other caching information in the core (e.g., or in the uncore) that are related to the logical processor or the core execution history or to mark a context switch event between two software threads so that the mark can be used by the hardware, etc.

A processor can enumerate the support of HRESET instruction, the control MSR (e.g., IA32_HRESET_ENABLE) (e.g., in format 300 in FIG. 2), and the possible support HRESET control capabilities by CPUID bits. In one embodiment, the execution of a CPUID instruction returns processor (e.g., CPU) identification data and feature information to certain registers (e.g., the EAX, EBX, ECX, and EDX registers). In one embodiment, the support of the HRESET instruction and the control MSR is indicated by the checking of the feature support bit, CPUID [0x7, ECX=1].EAX[22]. The enumeration of the support capabilities of HRESET and possible valid setting into the control MSR can be done by the allocation in 32-bit register (e.g., general purpose register), e.g., in a specific CPUID leaf. The 32 bits can be, CPUID[0x20,ECX=0].EBX[31:0].

A possible format of the CPUID can be as below in Table 1.

TABLE 1

Example CPUID bits.

| CPUID Bits | Description |
|---|---|
| CPUID[0x7, ECX = 1].EAX[22] | Indicates that MSR and HRESET instruction (e.g., and CPUID leaf 0x20) are supported |
| CPUID[0x20, ECX = 0].EBX[0] | Indicates that the support of HRESET EAX[0] parameter and HRESET_ENABLE [0] MSR for enabling HGS reset or enabling HGS and other history "HGS PLUS" reset |
| CPUID[0x20, ECX = 0].EBX[31:1] | Reserved for HRESET EAX[31:1] and A32_HRESET_ENABLE[31:1] capabilities |

In case that an embodiment of an HRESET instruction is used by two different users (e.g., companies), it is possible that each user will define its version of the control MSR that will enable different types of capabilities per user, e.g., with the enumeration in this case done ether by specific allocate CPUID leaf or sub leaf per company. Another option can be by sharing the same control and enumeration MSR or CPUID leaf or sub leaf.

In certain implementations supported by a new opcode, it is possible as well to check that the software set a valid value into the HRESET control parameter (e.g., in register EAX). Thus, it may be desirable to confirm that the setting of the control parameters (e.g., in register EAX) matches the setting(s) that was done by the OS into the opt-in MSR (e.g., IA32_HRESET_ENABLE). In case that one of the control bits in the control parameter (e.g., stored in register EAX) does not match the corresponding bit set in the MSR (e.g., IA32_HRESET_ENABLE), an exception is generated in certain embodiments (e.g., a general-protection exception).

In one embodiment, it the software does not enable any history reset capabilities by the instruction (e.g., EAX) parameter, the HRESET instruction is executed by the hardware as a no-operation (NOP), e.g., with or without some extra execution latency over regular NOP.

In one embodiment, the pseudocode for initializing a (e.g., 32 bit mode) HRESET MSR (e.g., IA32_HRESET_ENABLE) is:

```
If (CPUID[HRESET]) {
  OS_HRESET_CAP = CPUID[HRESET_CAP]
  WRMSR IA32_HRESET_ENABLE, HRESET_CAP }
```

The setting of IA32_HRESET_ENABLE value can be a sub set of the CPUID[HRESET_CAP] bits.

In one embodiment, the pseudocode for execution of an HRESET instruction to reset the software thread runtime property histories only when CPL=zero (ring 0) is:

```
UNDEFINED (#UD) if HRESET is not supported (CPUID[7,
ECX=1].EAX[22] ==0)
GENERAL PROTECTION FAULT (#GP(0)) if CPL>0 or
((EAX AND NOT IA32_HRESET_ENABLE)!= 0)
IF EAX = 0
  THEN NOP
ELSE
  FOREACH i such that EAX[i]
    Reset history for feature i
```

In one embodiment, an implementation of execution of an HRESET instruction avoids speculative execution while the reset operation is occurring by enabling pre-serialized support. In one of these embodiments, the pseudocode for execution of an HRESET instruction is:

```
IF EAX = 0
  THEN NOP
ELSE // no speculative execution of the below
  FOREACH i such that EAX[i]
    Reset history for feature i
```

In one embodiment, when EAX operand=0, the attempted execution of HRESET in ring 0 is a NOP. In one embodiment, when EAX operand=0 and IA32_HRESET_ENABLE==0, the attempted execution of HRESET in ring 0 is a NOP (e.g., as requested for execution by an OS, VMM, or VM OS).

In certain embodiments, execution of the instruction does not modify any architectural state (registers, memory, flags, etc.) other than the software thread runtime property histories (e.g., within a hardware guide scheduler) reset by execution of a HRESET instruction.

In certain embodiments, a history reset (HRESET) instruction has one or more fields according to the following format:

| Opcode/ Instruction | Operand Encoding (Op/En) | 64/32 bit Mode Support | CPUID Feature Flag | Description |
|---|---|---|---|---|
| F3 0F 3A F0 C0/ib HRESET imm8, <EAX> | A (see below) | Yes (V)/ Yes (V) | HRESET | Processor history reset request. Controlled by the EAX implicit operand. |

In certain embodiments, a history reset (HRESET) instruction has one or more fields according to the following operand encoding "A":

| Op/En | Tuple | Operand 1 | Operand 2 | Operand 3 | Operand 4 |
|---|---|---|---|---|---|
| A | Not Applicable | ModRM:r/m (r) | Not Applicable | Not Applicable | Not Applicable |

In certain embodiments, a history reset (HRESET) instruction has the following description. Execution of certain embodiments of a history reset (HRESET) instruction provides a hint to the processor to selectively reset the prediction history of the current logical processor. In certain embodiments, the HRESET operation is controlled by the implicit EAX operand, e.g., and the value of the explicit immediate (e.g., eight bit wide "imm8") operand is ignored. In certain embodiments, CPUID.07H.01H:EAX.HRESET [bit 22] indicates support of a HRESET instruction. In certain embodiments, this instruction can only be executed at CPL of zero. In certain embodiments, a HRESET instruction is capable of providing a reset hint for multiple predictions.

In certain embodiments, prior to the execution of a HRESET instruction, the system software must take the following steps:
1. Enumerate the HRESET capabilities via CPUID.20H.0H:EBX, which indicates what predictions can be reset, and
2. Opt-in to reset a subset of the available capabilities by setting the respective bits in the IA32_HRESET_ENABLE MSR. For example, where the opt-in bits in the IA32_HRESET_ENABLE MSR are aligned with the HRESET capabilities CPUID bits.

In certain embodiments, the implicit EAX operand must contain set bits that are a subset of those set in the IA32_HRESET_ENABLE MSR, e.g., and otherwise, HRESET generates #GP(0). In certain embodiments, when EAX=0, a HRESET instruction is interpreted as a NOP. In certain embodiments, any attempt to execute a HRESET instruction inside a transactional region will result in a transaction abort.

In certain embodiments, a history reset (HRESET) instruction has the following operation:

```
IF EAX = 0
    THEN NOP
ELSE
    FOREACH i such that EAX[i] = 1
        Reset prediction history for feature i
FI //E.g., closing the IF statement
```

In certain embodiments, a history reset (HRESET) instruction does not affect any flags of a processor.

In certain embodiments, a history reset (HRESET) instruction includes one or more of the following protected mode exceptions:

| #GP(0) | If CPL > 0 or (EAX AND NOT IA32_HRESET_ENABLE) ≠ 0. |
| #UD | If CPUID.07H.01H:EAX.HRESET[bit 22] = 0. |

In certain embodiments, a history reset (HRESET) instruction has real-address mode exceptions that are the same of the protected mode exception(s) above.

In certain embodiments, a history reset (HRESET) instruction includes the following a virtual-8086 mode exception:
    #GP(0) HRESET instruction is not recognized in virtual-8086 mode.

In certain embodiments, a history reset (HRESET) instruction has compatibility mode exceptions that are the same of the protected mode exception(s) above.

In certain embodiments, a history reset (HRESET) instruction has 64-bit mode exceptions that are the same of the protected mode exception(s) above.

In certain embodiments, execution of a CPUID instruction (e.g., when register EAX has an initial value of 07H and register ECX has an initial value of 1), causes an output where the bit having an index position of 22 in EAX is for the HRESET, e.g., when a one, indicating the (e.g., logical) processor supports history reset (HRESET) and the IA32_HRESET_ENABLE MSR and/or that the Processor History Reset Leaf (e.g., EAX=20H) is valid. In certain (e.g., processor history reset sub-leaf) embodiments, execution of a CPUID instruction (e.g., when register EAX has an initial value of 20H and register ECX has an initial value of 0), causes an output where registers: EAX reports the maximum number of sub-leaves that are supported in leaf 20H, EBX indicates which bits may be set in the IA32_HRESET_ENABLE MSR to enable enhanced hardware feedback interface history, and ECX and EDX are reserved.

In certain embodiments, execution of HRESET instruction explicitly resets an enhanced hardware feedback interface (EHFI) history.

In certain embodiments, there is an implicit EHFI history reset (e.g., instead of a reset in response to execution of a HRESET instruction).

In certain embodiments, the EHFI history is implicitly reset in any of the following scenarios:
1. When the processor enters or exits SMM mode and IA32_DEBUGCTL MSR.FREEZE_WHILE_SMM (bit 14) is set, the EHFI history is implicitly reset by the processor.
2. When GetSec[SENTER] is issued (e.g., to initiate the launch of a measured environment and place the initiating logical processor (ILP) into an authenticated code execution mode), the processor resets the EHFI history on all logical processors in the system, including logical processors on other sockets (other than the one GetSec(SENTER) is executed).
3. When GetSec[ENTERACCS] is issued, the processor resets the EHFI history on the logical processor it is executed on.
4. When INIT or Wait for Startup Inter Processor Interrupt (SIPI) signals are processed by a logical processor, the EHFI history is reset whether the signal was a result of GetSec[ENTERACCS] or not.

In certain embodiments, if the operating system requires EHFI to be active after exiting the measured environment or when processing a SIPI event, it should re-enable EHFI.

FIG. 4 illustrates an operating system (OS) scheduler control flow (e.g., assembly code) diagram 400 according to embodiments of the disclosure. For example, including ending the current thread execution (e.g., and saving the current thread context) at 402, if (CPUID.HRESET==1) {MOV EAX, OS support history reset options and executing HRESET} at 404, and resume/initialize new thread execution (e.g., and resume/initialize the new thread context) at 406. HRESET may take an immediate value (e.g., imm8) as an operand. In one embodiment, CPUID.HRESET==1 is implemented by setting CPUID.07H.01H:EAX.HRESET [bit 22]==1.

FIG. 5 illustrates an application level control flow (e.g., assembly code) diagram 500 according to embodiments of the disclosure. For example, including OS scheduler using thread runtime management to end software (S/W) task at 502, if (CPUID.HRESET==1) {MOV EAX, OS support history reset options and executing HRESET} at 504, and OS scheduler using thread runtime management to resume/initialize new S/W task at 506

Figure 6:
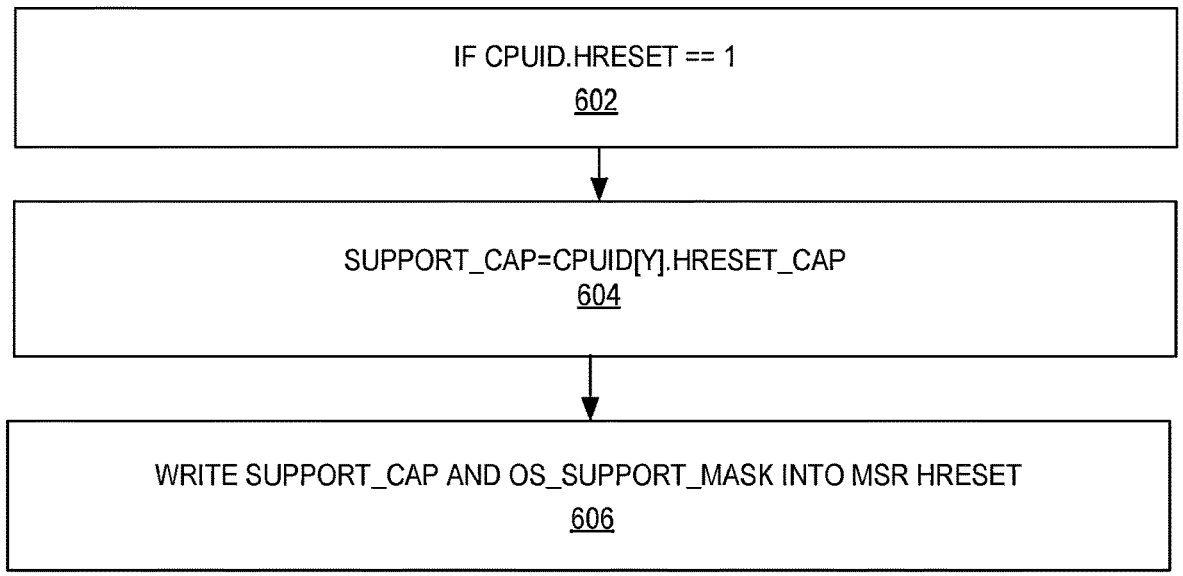
FIG. 6 illustrates an operating system (OS) reset flow diagram according to embodiments of the disclosure.

FIG. 6 illustrates an operating system (OS) reset flow (e.g., assembly code) diagram 600 according to embodiments of the disclosure. For example, checking if CPUID.HRESET==1 at 602, performing SUPPORT_CAP=CPUID[Y].HRESET_CAP at 604, and writing SUPPORT_CAP and OS_SUPPORT_MASK into MSR HRESET at 606. In one embodiment, CPUID[Y] .HRESET_CAP is CPUID[0x20, ECX=0].EBX[31:0].

Figure 7:
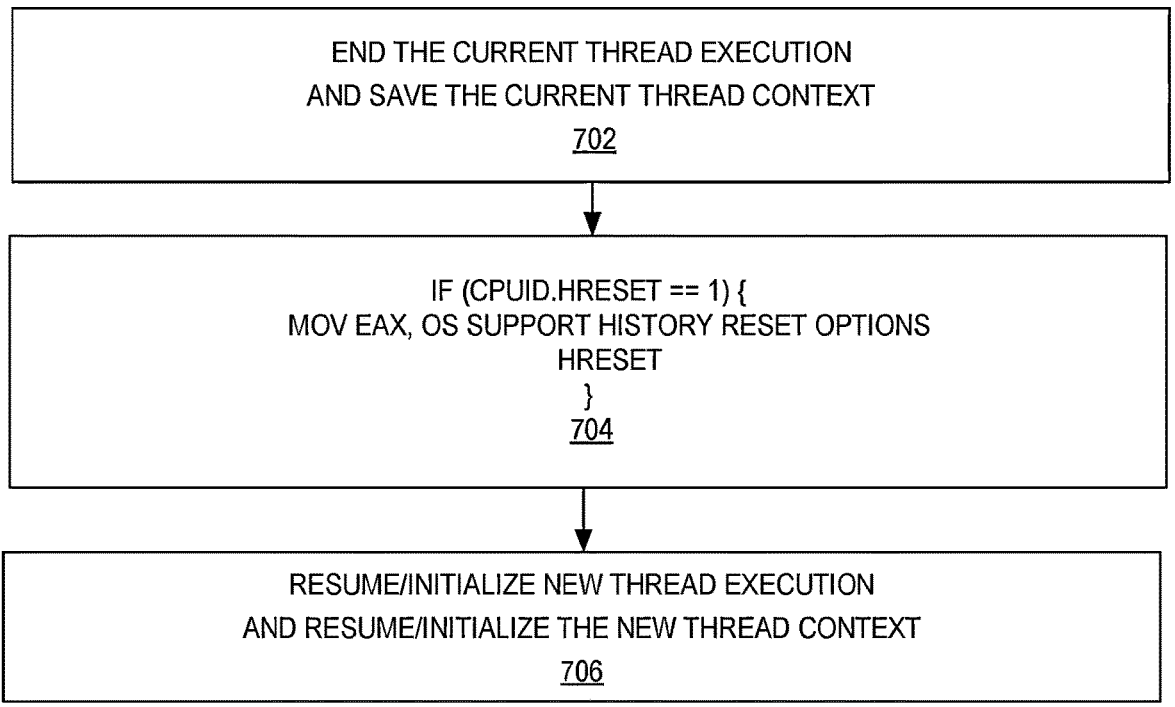
FIG. 7 illustrates an operating system (OS) scheduler flow diagram according to embodiments of the disclosure.

FIG. 7 illustrates an operating system (OS) scheduler flow (e.g., assembly code) diagram 700 according to embodiments of the disclosure. For example, ending the current thread execution and saving the current thread context at 702, if (CPUID.HRESET==1) {MOV EAX, OS support history reset options and executing HRESET} at 704, and resume/initialize new thread execution and resume/initialize the new thread context at 706.

In one embodiment, the OS utilizes the HRESET control parameter in (e.g., EAX) a register to control in run time what be the exact reset history type (e.g., the instruction's capabilities). In certain embodiments, using the instruction's parameter is a simpler method over setting an MSR in run time. In certain embodiments, this enables the OS to reset the history (e.g., and a proper subset of types of history) per software thread type (e.g., a first thread type for a first application and a second thread type for a second application).

In certain embodiments, the OS can reset the processor history as well during run time of the software thread (and not only during context switch).

In certain embodiments, the usage model of a HRESET instruction assumes that following execution of the HRESET instruction, the histories that were reset have no impact on any operation that is done following this event (e.g., after execution of the HRESET) instruction, for example, even in a processor that supports out of order and speculative of execution, the assumption may be that the rule of ordering of event will be kept.

For example, as part of the hardware guide scheduler, the hardware enable MSR that returns a feedback to the OS based on runtime history (e.g., to provide a hint) before the reading of this MSR.

For the below flow:
the execution of the HRESET instruction causes reset of hardware guide scheduler (HGS) (e.g., HGS PLUS)// Guarantees that the HGS (for example, plus any other history to be reset as indicated by capabilities, e.g., referred to cumulatively as HGS PLUS) before this HRESET instruction is not visible any more for any following reads of the MSR (e.g., RDMSR and/or a thread feedback MSR (e.g., IA32_THREAD_FEEDBACK_CHAR MSR)) to obtain the hints (e.g., as discussed above in reference to FIG. 2). In certain embodiments, this is done under the assumption that reading of the feedback is supported (e.g., as well as pre-serialization) and/or that the RDMSR is also defined as pre or full serialization ISA, e.g., so it is protected by the hardware that the RDMSR will be executing on after the HRESET completes its execution flow. In certain embodiments, a processor is not to execute a HRESET instruction speculatively, e.g., to avoid repopulating histories (e.g., in the HGS) after the processor assumes the histories have been cleared.

An example support of this is shown in the below flow:
HRESET [HGS_RESET]//guarantees that the HGS (e.g., HGS PLUS) history before the HRESET instruction is not visible any for the following (e.g., RDMSR) HGS (e.g., HGS PLUS) history feedback for an OS's use, e.g., due to a pre-serialization support model of an embodiment of HRESET.
RDMSR history feedback//Assume pre-serialize of this MSR reading (e.g., with this MSR including a hint to indicate a core type based on the HGS (e.g., HGS PLUS) history) This flow may be used to create a serialization between the execution of an HRESET instruction that is resetting the history of the HGS and before the reading of HGS (e.g., HGS PLUS) history (e.g., via an MSR) as feedback to the OS.

In certain embodiments, to avoid speculation execution of this instruction, before actual execution of the history reset, the instruction flow ensures no speculative execution only while the conditions for history reset are happened. In one embodiment for some specific HRESET support feature, it is possible to add a strong ordering support like full serialized instruction. In one embodiment, it is possible to define the HRESET support with full serialized instruction or only when the history reset conditions are met. In certain embodiments, in case that these conditions have not happened (and an exception has not happened due wrong setting/usage), there is no side effect of possible speculative execution of this instruction while it is operated as a NOP. In certain embodiments, an instruction avoids serialization only when it is set to operate as a NOP, e.g., in case that one of the capability bit(s) is set in the EAX operand, this instruction is executed while the pre-serialization is enabled.

FIGS. 8A-8D illustrate OS and virtual machine monitor (VMM) support model flow diagrams according to embodiments of the disclosure.

In certain embodiments, a Virtual Machine Monitor (VMM) (also known as a hypervisor) is a software program that, when executed (e.g., in supervisor mode but not in user mode), enables the creation, management, and governance of VM instances and manages the operation of a virtualized environment on top of a physical host machine. A VMM is the primary software behind virtualization environments and implementations in certain embodiments. When installed over a host machine (e.g., processor) in certain embodiments, a VMM facilitates the creation of VMs (e.g., VM Launch), for example, each with separate operating systems (OS) and applications. The VMM may manage the backend operation of these VMs by allocating the necessary computing, memory, storage and other input/output (I/O) resources, such as, but not limited to, an input/output memory management unit (IOMMU). The VMM may provide a centralized interface for managing the entire operation, status and availability of VMs that are installed over a single host machine or spread across different and interconnected hosts. In certain embodiments, switching between VMs (e.g., VM entering, VM resuming, and/or VM exiting) requires a switch of the processor core to a supervisor mode (e.g., instead of staying in a user mode).

FIG. 8A illustrates an OS support model flow diagram according to embodiments of the disclosure. For example, with a possible OS HRESET usage model 801 that (1) during OS boot time, the OS checks if HRESET is supported by enumerating the functional CPUID CPUID[7,1][22] bits to (i) enumerate the HRESET capabilities via CPUID[0x20, ECX=0].EBX[31:0] which indicate what predictions can be reset, and (ii) Opt-in to resetting a subset of the available capabilities by setting the respective bits in IA32_HRESET_ENABLE MSR. For example, that the opt-in bits in IA32_HRESET_ENABLE MSR are aligned (match 1 to 1) with the HRESET capabilities CPUID bits, and (2) during S/W thread context switch, the OS should clear the H/W history of the current S/W thread and before the new S/W thread start its runtime to (i) set the target reset features by the HRSET EAX operand, (ii) the HRESET EAX operand is to contain set bits that are a subset of those set in IA32_HRESET_ENABLE MSR (e.g., otherwise, HRESET generates #GP(0)), and (iii) executed HRESET EAX ISA.

As part of virtualization, in one model, the VMM cannot prevent guest software from executing HRESET and HRESET cannot cause VM exit, and has no corresponding VM-execution control.

In one embodiment, the VMM can control which bits are set in HRESET_ENABLE (e.g., MSR of format 300 in FIG. 3) (e.g., IA32_HRESET_ENABLE) by intercepting a guest write (WRMSR) of the MSR and a guest read (RDMSR) of this MSR. In one embodiment, the VMM can decide which features for which it allows a guest to reset history. In one embodiment, the VMM can control by virtualizing the CPUID bits of those feature that will be valid for guest support. In one embodiment, the VMM emulates the HRESET_ENABLE MSR to enable only those bits that are permitted to be set by the guest. In one embodiment, the VMM maintains the MSR with the value expected by the guest OS. In this model, if the VMM avoids any setting into HRESET_ENABLE, the guest can only execute a HRESET instruction as NOP.

Figure 8B:
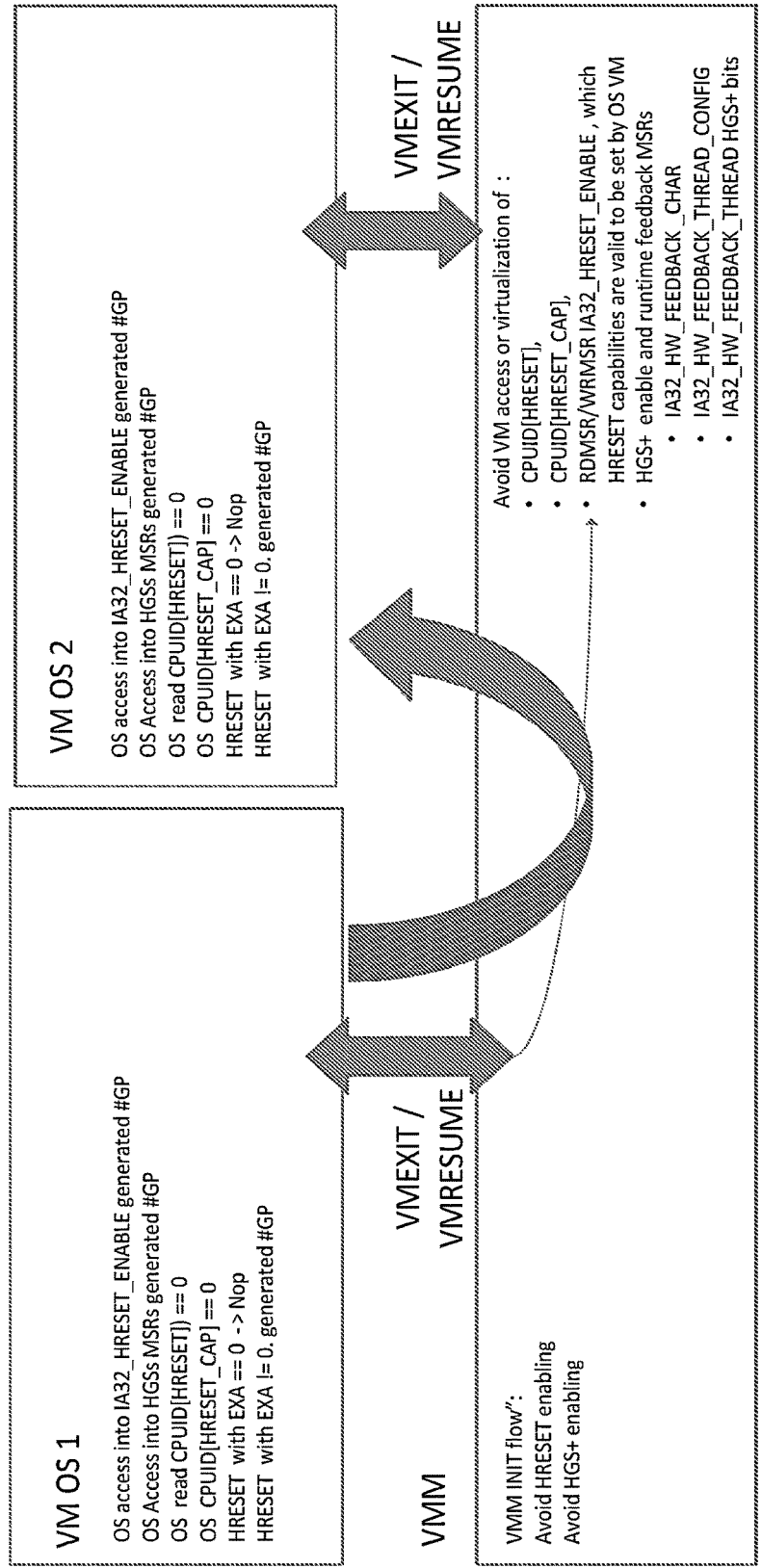

Virtualization support may use one or more of the following three usage models:

In one model (e.g., model 802 as shown in FIG. 8B), the VMM is unaware of HRESET instruction support, e.g., if the VMM is unaware about this new instruction it will not enumerate it and will not enable it for its OS VM guest. For example, such that the new CPUID feature bit of this instruction will not be enabled for the VM guest under this VMM. In one embodiment of this case, the OS guest will not be able to enumerate the support of this new instruction and the OS should not use it. As a result, the VMM by itself will not set the capabilities MSR IA32_HRESET_ENABLE and because the guest OS will not be able to set the control MSR by itself (e.g., the VMM will not virtualize these MSR(s) for VM OS usage), this MSR will remand clear and as result in certain embodiments. In certain embodiments of this model, the VM OS (guest) will not be able to enumerate the support of HRESET instruction (due that the VMM doesn't enable it) and the expectation is that the VM OS (guest) will not enable and use the HRESET instruction, if VM OS requests execution of this new instruction, in one model (e.g., when this instruction parameter in register EAX is clear), the HRESET will execute as a NOP. If EAX will not be clear, execution of this new instruction will be results with the GENERAL PROTECTION FAULT expectation.

In one embodiment (e.g., as shown in FIG. 8B), VMM Possible Usage Model includes (1) during VMM boot time, the VMM will not enable the HRESET support, following it, the VMM will not enable the HGS+ support, (2) avoiding virtualizing the HRESET CPUID function bit, avoid virtualizing the HRESET CPUID capabilities bits and the IA32_HRESET_ENABLE MSR, and avoid virtualization of HGS+ CPUID bits and HGS+ MSR, enabling for VM usage if HRESET is supported and its subset or all capabilities bits, and/or OS as VM of HRESET is possible only while its implicit operand EAX==0, in this case it is executed as NOP, and if EAX=!0, execution of HRESET will be generated #GP.

Figure 8C:
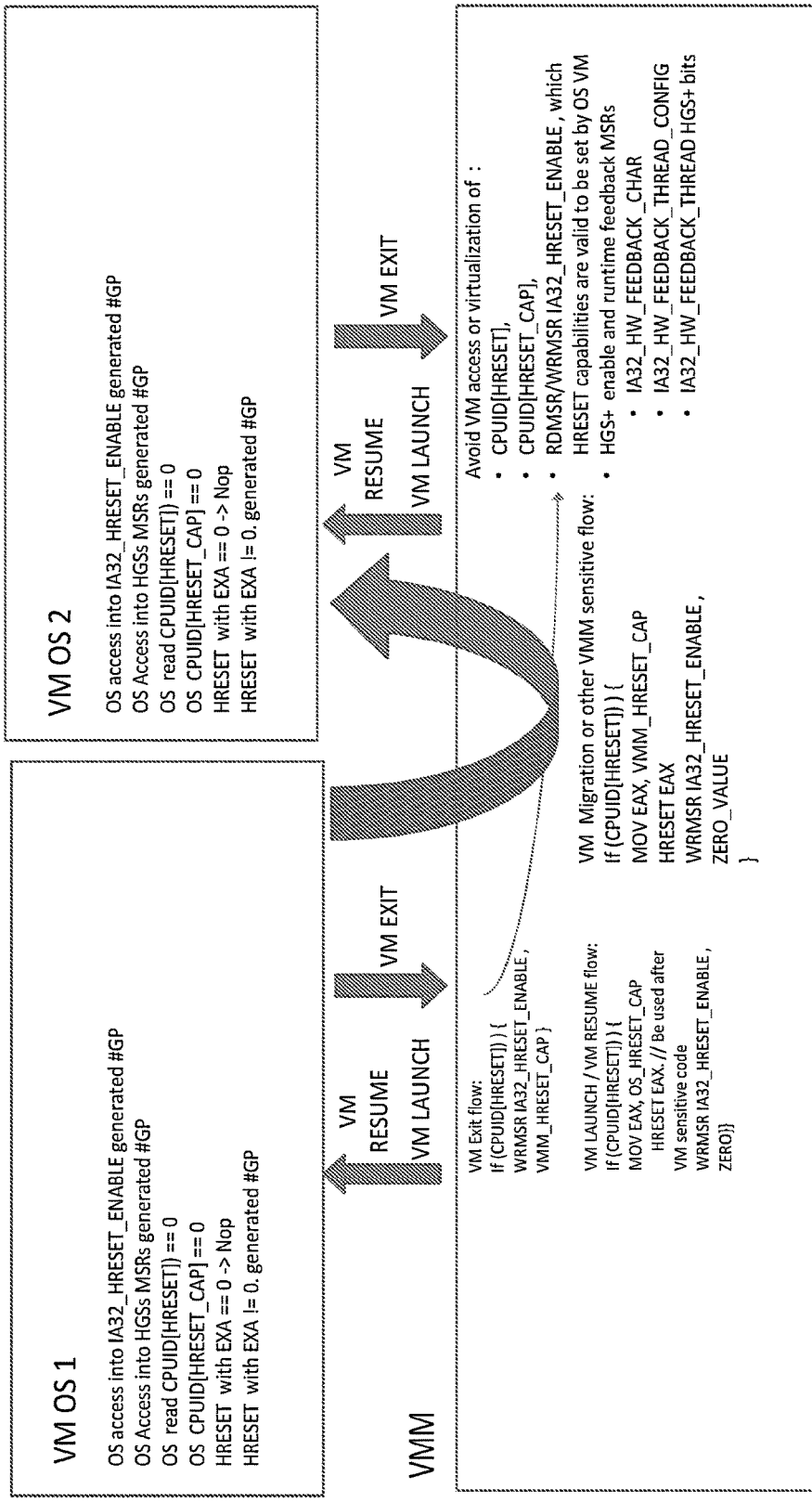

In another model (e.g., model 803 as shown in FIG. 8C), the VMM is aware of HRESET instruction support but avoids the usage of this new instruction from its guest OS, e.g., in case the VMM is aware about the HRESET instruction and enables it for its usage, it means that the VMM includes enumeration support of the HRESET as feature and its capabilities, same as the regular OS (e.g., not a VM OS). In one embodiment, the VMM also include the usage of HRESET as part of its scheduler support flow or in other VMM's thread run time management and use this instruction only if the hardware supports it. In one embodiment, VMM can use the HRESET in case that the VMM should reset its own history and to avoid the possibility that a VM (e.g., guest) may have direct or indirect access to this history.

In one embodiment, the VMM is to opt-in the set of HRESET history reset capabilities. In one embodiment, the VMM is to set into the HRESET EAX parameter the capabilities bit(s) that were also set into the opt-in MSR IA32_HRESET_ENABLE. In this usage case, the VMM avoids from its guest the use of the HRESET MSR. In one embodiment, the VMM emulates the CPUID and avoids from the VM OS guest the option to enumerate the support of HRESET and its capabilities. In one embodiment, the VMM avoids from the VM OS guest the option to access into the IA32_HREST_ENABLE. In one embodiment, before a VMM resumes into the VM OS guest, it is to keep the IA32_HRESET_ENABLE clear. In one embodiment, during exiting from the virtual machine (VMEXIT) and before execution of a VMM's thread, it is up to the VMM to resume its setting value into the IA32_HRESET_ENABLE. In certain embodiments, if the VM OS guest has no option to access or be impacted by the (e.g., HGS or HGS plus) history that was collected during the VMM runtime including its software thread or service, it is valid not to reset the history before resuming back into the VM OS guest. In another embodiment, the VMM is to reset the history with a HRSET instruction (e.g., where allowed by the VMM HRESET capabilities) before resume into the OS VM guest, in case that the VMM software threads are active or the VMM uses its service that may include sensitive information that should be reset by a history reset. In certain embodiments, the following flow is to be used. In one embodiment, the history reset can be performed only for a subset of capabilities (e.g., execution of HRESET with the VMM HRESET EAX parameter value).

An example flow (e.g., run by a VMM before resuming a VM) is:
WRMSR HRESET_ENABLE, VMM support capabilities
MOV EAX, VMM support capabilities
HRESET imm8 II clearing the HGS history
WRMSR HRESET_ENABLE, ZERO_VAL In certain usage models, e.g., due the missing the option from the VM OS guest to enumerate the support of HRESET instruction and its capabilities, and the option to write into the opt-in MSR IA32_HRESET_ENABLE, the OS VM guest will not use the HRESET instruction in certain embodiments. In one embodiment, if VM OS still requests execution of this new instruction (e.g., when this instruction parameter in EAX register is clear), the HRESET will execution as a NOP. In one embodiment, if the register utilized by the instruction (e.g., EAX) is not clear (e.g., all zeros), execution of the instruction will cause a (e.g., GENERAL PROTECTION FAULT) exception.

In one embodiment, a VMM Only Usage Model of HRESET (e.g., as shown in FIG. 8C) may include one or more of:
1. During VMM boot time, the VMM checks if HRESET is supported by enumerating the functional CPUID CPUID[7,1][22] bit
   1. Enumerating the HRESET capabilities via CPUID [0x20, ECX=0].EBX[31:0] which indicate what predictions can be reset
   2. Opt-in to resetting a subset of the available capabilities by setting the respective bits in IA32_HRESET_ENABLE MSR. The opt-in bits in IA32_HRESET_ENABLE MSR are aligned (match 1 to 1) with the HRESET capabilities CPUID bits.
   3. Save the VMM usage HRESET capabilities for its use
2. The VMM should restore its IA32_HRESET_ENABLE MSR setting after VMEXIT in case that the VMM is going to use the HRESET instruction, in this case, the VMM should zero the VM IA32_HRESET_ENABLE setting before VMLAUNC or VMRESUM in order to avoid from its VM the option to execute HRESET other than as a NOP.
3. During VMM's S/W thread context switch, the VM should clear the H/W history of the current S/W thread and before the new S/W thread start its runtime
   1. Set the target reset features by the HRESET EAX operand
   2. The HRESET EAX operand must contain set bits that are a subset of those set in IA32_HRESET_ENABLE MSR, Otherwise, HRESET generates #GP(0).
   3. Execute HRESET EAX ISA
4. During VMM VM Migration flow or other VMM event that request to reset the current H/W history, if HRESET is supported (check the function CPUID)
   1. The VMM may need to resume the IA32_HRESET_ENABLE MSR value into the VMM support value, if this MSR is virtualized for VM usage
   2. Set the VMM target reset features by the HRESET EAX operand
   3. Execute HRESET EAX ISA
   4. In this case, the VMM should zero the VM IA32_HRESET_ENABLE setting before VMLAUNC or VMRESUM in order to avoid from its VM the option to execute HRESET other than as a NOP.
5. The VMM should not virtualize the HRESET CPUID bits (e.g., CPUID[7,1][22] and HRESET CPUID[0x20, 0].EBX) and the IA32_HRESET_ENABLE MSR
   1. Whenever the VM tries to access the IA32_HRESET_CTL_ENABLE MSR, the VMM should issue a general purpose fault to the VM.
   2. CPU will not deliver #UD when guest OS executes HRESET as a result, instead CPU will:
      1. Execute HRESET as NOP when EAX=0 (not requesting to reset any history)
      2. Deliver #GP(0) if EAX !=0

Figure 8D:
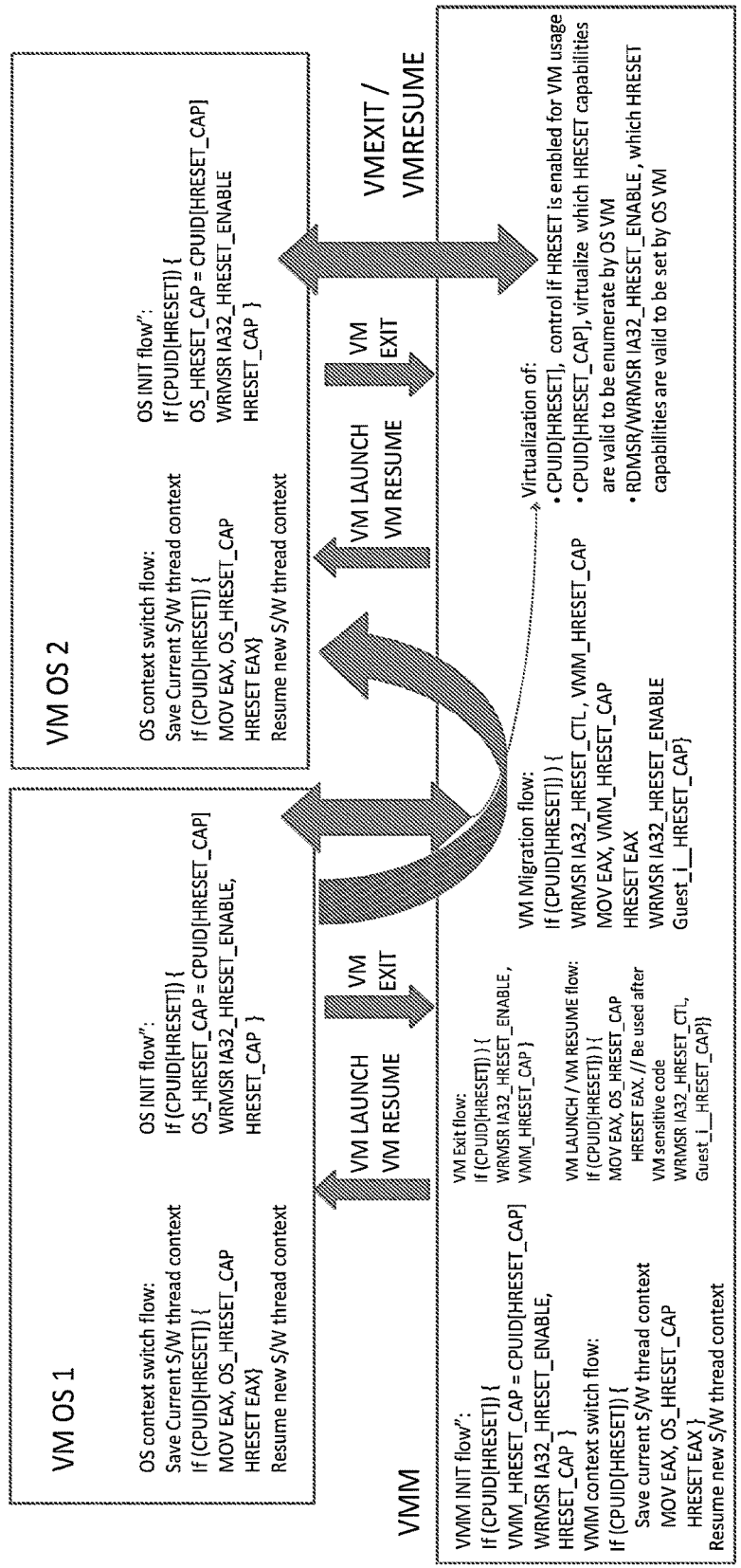

In certain embodiment of this model, a VMM can control (e.g., as shown in FIG. 8D) which bits are set in IA32_HRESET_ENABLE, VMM can intercept guest WRMSR and RDMSR to this MSR, VMM can decide which history capabilities it allows a guest to reset, will enumerate a subset of the capability bits to the guest (e.g., virtualized CPUID), on intercepting write MSR (WRMSR), VMM will deliver #GP(0) to the guest if it tried to set any bit beyond the subset allowed by the VMM in the CPUID, and/or VMM should maintain the MSR value for the guest when guest has set capability bits allowed by the VMM as well as during VM switch.

In yet another model (e.g., model 804 as depicted in FIG. 8D), the VMM is aware of HRESET instruction support and enables HRESET support into its VM OS, e.g., the VMM enumerates and supports HRESET in the same way as the regular OS. In certain embodiments of this model, the VMM enables the HRESET to be used by the VM OS guest. In certain embodiments, it includes enable for the VM OS guest the option to enumerate the HRESET instruction support by the CPUID.HRESET (e.g., where CPUID.HRESET is CPUID[0x7,ECX=1].EAX[22]) and the capabilities of HRESET by the CPUID.HRESET_CAP (e.g., CPUID[0x20].EBX[31:0]). In certain embodiments, this is done by emulating the CPUID instruction. In certain embodiments, the VMM enables the VM OS guest the option to enable and opt-in the HRESET capabilities for the VM OS guest and access into the HRESET configure MSR IA32_HRESET_ENABLE. In certain embodiments, this type of support is provided by emulating the support of IA32_HRESET_ENABLE for the VM OS guest. In certain embodiments, the VMM can enable a subset of the H/W support capabilities for the VM OS guest usage, e.g., by emulating only this subset as part of the CPUID.HRESET_CAP (e.g., where HRESET_CAP is CPUID[0x20, ECX=0].EBX[31:0]) and controlling that only these capabilities bits will be enabled by the VM OS guest in the MSR HRESET_ENABLE. In certain embodiments, wrong and unsupported setting of bits by the VM OS guest into the emulated MSR HRESET_ENABLE triggers a general protection exception from the VMM into the VM OS guest. In another option, the VMM can enable the VM OS guest to read the IA32_HRESET_ENABLE without emulation.

In certain embodiments, during VM OS guest runtime and before the VMM execution VMM's thread or VMLAUNC, VMRESUME should keep resuming the IA32_HRESET_ENABLE into the VM OS guest setting value of this MSR while this value is saved as part of the emulation of this MSR.

In certain embodiments, during VMEXIT and before execution VMM's thread or VM switch into other VM OS guest, it is up to the VMM to first reset the history of the current guest and to resume its setting a value into the HRESET_ENABLE before executing HRESET with the VMM HRESET EAX parameter value. The two resets call can be merged into a single call that include the common setting of HRESET capabilities. In certain embodiments, the history reset is done only when it be possible that the VMM's operations can impact the guest's history and/or it is desirable to avoid a leak of history from the guest to the VMM.

An example flow is:
MOV EAX, current VM OS guest support capabilities
HRESET//clearing the current guest history
WRMSR HRESET_ENABLE, VMM support capabilities
MOV EAX, VMM support capabilities
HRESET imm8//clearing the VMM's relevant history The above flow with two HRESET operations may be used when there is not a match between the two configurations, however, it is possible to optimize this flow into single usage of HRESET. An example of this flow is show below:
WRMSR HRESET_ENABLE, VMM support capabilities OR current VM OS guest support capabilities
MOV EAX, VMM support capabilities OR current VM OS guest support capabilities
HRESET imm8//clearing the VMM relevant history
WRMSR HRESET_ENABLE, VMM support capabilities In certain embodiments, before resuming back into a VM OS guest, it is up to the VMM to reset the history that was collected during its runtime and resume back into the VM OS guest IA32_HRESET_ENABLE. In one embodiment, the resetting of information by a VMM is done in case of an execution of VMM software threads or execution of other VMM sensitive work.

An example flow is:
MOV EAX, VMM support capabilities OR VM OS guest support capabilities
HRESET imm8//clearing the VMM relevant history
WRMSR HRESET_ENABLE, VMM support capabilities OR VM OS guest support capabilities In certain embodiments of a context switch between two different VM OS guests, the VMM is to reset the history based on the old and the new VM OS guest capabilities setting (e.g., if they do not match) and save and restore the IA32_HRESET_ENABLE values.

An example flow is:
Save the current VM OS Guest by RDMSR IA32_HRESET_ENABLE MSR
MOV EAX, current guest support capabilities
HRESET imm8
WRMSR IA32_HRESET_ENABLE, new guest support capabilities
MOV EAX, new guest support capabilities
HRESET In certain embodiments, the flow includes two instances of HRESET where there is no matching between the two HRESET configurations, however, it is possible to optimize it into a single HRESET operation.

An example flow is:
Save the current VM OS Guest by RDMSR IA32_HRESET_ENABLE MSR
WRMSR IA32_HRESET_ENABLE, new guest support capabilities OR current VM OS Guest
MOV EAX, new guest support capabilities OR current VM OS Guest
HRESET imm8
WRMSR IA32_HRESET_ENABLE, new guest support capabilities In one embodiment, a VMM and VM(s) Usage Model (e.g., as shown in FIG. 8C and FIG. 8D) may include one or more of:
1. During VMM boot time, the VMM checks if HRESET is supported by enumerating the functional CPUID CPUID[7,1][22] bit
   1. Enumerate the HRESET capabilities via CPUID [0x20, ECX=0].EBX[31:0] which indicate what predictions can be reset
   2. Opt-in to resetting a subset of the available capabilities by setting the respective bits in IA32_HRESET_ENABLE MSR. The opt-in bits in IA32_HRESET_ENABLE MSR are aligned (match 1 to 1) with the HRESET capabilities CPUID bits.
   3. Save the VMM usage HRESET capabilities for its use
2. The VMM should restore its IA32_HRESET_ENABLE MSR setting after VMEXIT in case that the VMM is going to use the HRESET instruction, In this case, the VMM should restore/set the VM IA32_HRESET_ENABLE setting before VMLAUNC or VMRESUM
3. During VMM's S/W thread context switch, the OS should clear the H/W history of the current S/W thread and before the new S/W thread start its runtime
   1. Set the target reset features by the HRESET EAX operand
   2. The HRESET EAX operand must contain set bits that are a subset of those set in IA32_HRESET_ENABLE MSR, Otherwise, HRESET generates #GP(0).
   3. Execute HRESET EAX ISA 4. During VMM VM Migration flow or other VMM event that request to reset the current H/W history, if HRESET is supported (check the function CPUID)
   1. The VMM may need to resume the IA32_HRESET_ENABLE MSR value into the VMM support value, if this MSR is virtualized for VM usage
   2. Set the VMM target reset features by the HRESET EAX operand
   3. Execute HRESET EAX ISA
   4. Restore if need the IA32_HRESET_ENABLE MSR to the VM virtualized setting value of this MSR
5. Virtualize the HRESET CPUID bits and the IA32_HRESET_ENABLE MSR
   1. Enable for VM usage if HRESET is supported and its subset or all capabilities bits
      1. Virtualize the HRESET functional bit CPUID[7,1][22]
      2. Virtualize the HRESET CPUID[32,0].EBX
   2. Virtualize the HRESET control capabilities MSR
   3. It is possible to enable different support capabilities per VM
   4. The VMM may need to resume the IA32_HRESET_ENABLE MSR value into the VMM support value, if this MSR is virtualized for VM usage, in this case, the VMM will need to restore the VM value before resume this VM
   5. CPU will not deliver #UD when guest OS executes HRESET as a result, instead CPU will:
      1. Execute HRESET as NOP when EAX=0 (not requesting to reset any history)
      2. Deliver #GP(0) if EAX !=0

In certain embodiments of this model, a VMM can control which bits are set in IA32_HRESET_ENABLE, VMM can intercept guest write MSR (WRMSR) and read MSR (RDMSR) to this MSR, VMM can decide which history capabilities it allows a guest to reset, will enumerate a subset of the capability bits to the guest (e.g., virtualized CPUID), on intercepting WRMSR, VMM will deliver #GP(0) to the guest if it tried to set any bit beyond the subset allowed by the VMM in the CPUID, and/or VMM should maintain the MSR value for the guest when guest has set capability bits allowed by the VMM as well as during VM switch. In certain embodiments of this model, virtualization support for HRESET includes virtualization of the CPUID bits, for example, if a VMM is to allow a VM the option to use the HRESET, the VMM is to virtualize the HRESET function CPUID bit (e.g., CPUID[7,1].EAX[22]) and the HRESET capabilities that the VMM enables for the VM (e.g., by the CPUID[0x20].EBX bits).

In certain embodiments, a VMM cannot cause VM exit, e.g., if HRESET is in use by the VM, it has no corresponding VM-execution control and/or VMM cannot ensure HRESET is to always deliver #UD.

Figure 9:
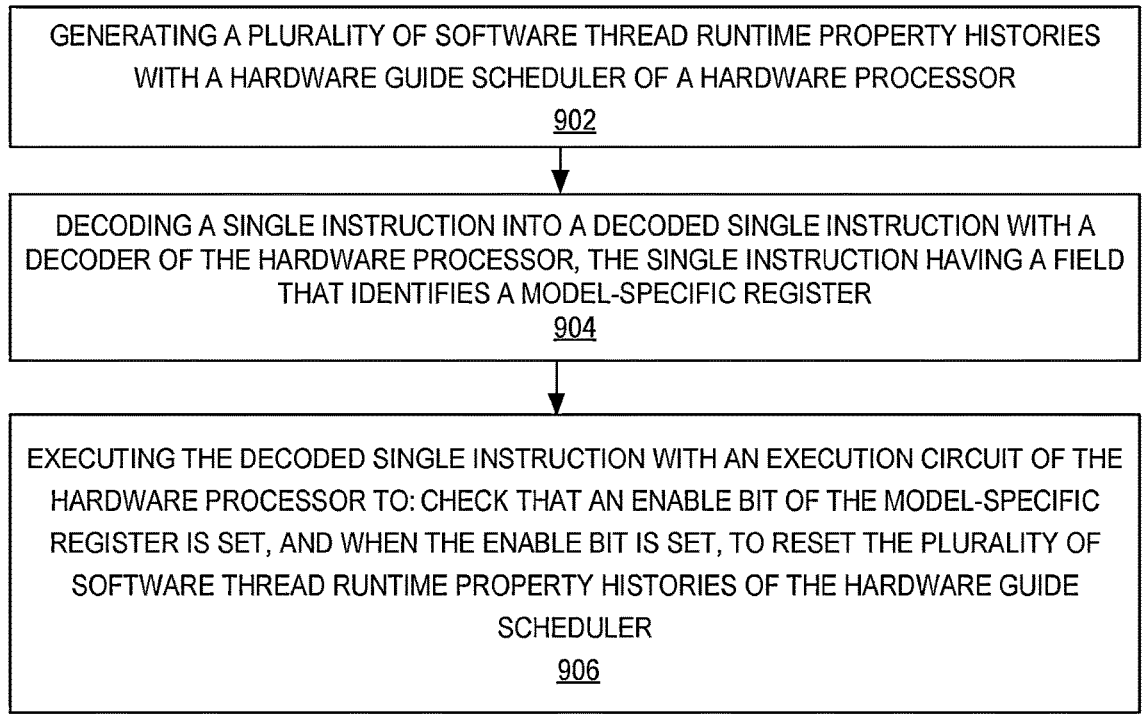
FIG. 9 illustrates a flow diagram according to embodiments of the disclosure.

FIG. 9 illustrates a flow diagram according to embodiments of the disclosure. Depicted flow 900 includes generating a plurality of software thread runtime property histories with a hardware guide scheduler of a hardware processor 902, decoding a single instruction into a decoded single instruction with a decoder of the hardware processor, the single instruction having a field that identifies a control register 904, and executing the decoded single instruction with an execution circuit of the hardware processor to check that an enable bit of the control register is set, and when the enable bit is set, to reset the plurality of software thread runtime property histories of the hardware guide scheduler 906.

Exemplary architectures, systems, etc. that the above may be used in are detailed below.

At least some embodiments of the disclosed technologies can be described in view of the following examples:

Example 1. A hardware processor comprising:
a hardware guide scheduler comprising a plurality of software thread runtime property histories;
a decoder to decode a single instruction into a decoded single instruction, the single instruction having a field that identifies a control register; and
an execution circuit to execute the decoded single instruction to:
check that an enable bit of the control register is set, and when the enable bit is set, to reset the plurality of software thread runtime property histories of the hardware guide scheduler.

Example 2. The hardware processor of example 1, wherein, when the enable bit is set, the execution circuit is to execute the decoded single instruction to reset the plurality of software thread runtime property histories of the hardware guide scheduler without modifying other architectural state of the hardware processor.

Example 3. The hardware processor of example 1, wherein an opcode of the single instruction is a legacy opcode, and when the enable bit is not set, the execution circuit is to execute the single instruction as a no-operation.

Example 4. The hardware processor of example 1, wherein, when the enable bit is set, the execution circuit is to execute the decoded single instruction to reset the plurality of software thread runtime property histories of the hardware guide scheduler only when the single instruction is requested for execution by an operating system.

Example 5. The hardware processor of example 1, wherein the plurality of software thread runtime property histories comprises a plurality of weights for respective classes of performance monitoring events for a plurality of cores of the hardware processor.

Example 6. The hardware processor of example 5, wherein the respective classes comprise a first class for a first type of core and a second class for a second, higher performance core.

Example 7. The hardware processor of example 5, wherein the respective classes comprise a first class for an integer type of vector instruction and a second class for a floating-point type of vector instruction.

Example 8. The hardware processor of example 1, wherein the hardware guide scheduler is to store a hint for a next software thread that is to be executed on the hardware processor, in a register of the hardware processor to indicate to an operating system a core type of a plurality of cores types of the hardware processor, and the hint is based on the plurality of software thread runtime property histories.

Example 9. A method comprising:
generating a plurality of software thread runtime property histories with a hardware guide scheduler of a hardware processor;
decoding a single instruction into a decoded single instruction with a decoder of the hardware processor, the single instruction having a field that identifies a control register; and
executing the decoded single instruction with an execution circuit of the hardware processor to:
check that an enable bit of the control register is set, and when the enable bit is set, to reset the plurality of software thread runtime property histories of the hardware guide scheduler.

Example 10. The method of example 9, wherein, when the enable bit is set, the executing the decoded single instruction resets the plurality of software thread runtime property histories of the hardware guide scheduler without modifying other architectural state of the hardware processor.

Example 11. The method of example 9, wherein an opcode of the single instruction is a legacy opcode, and when the enable bit is not set, the execution circuit executes the single instruction as a no-operation.

Example 12. The method of example 9, wherein, when the enable bit is set, the executing the decoded single instruction resets the plurality of software thread runtime property histories of the hardware guide scheduler only when the single instruction is requested for execution by an operating system.

Example 13. The method of example 9, wherein the plurality of software thread runtime property histories comprises a plurality of weights for respective classes of performance monitoring events for a plurality of cores of the hardware processor.

Example 14. The method of example 13, wherein the respective classes comprise a first class for a first type of core and a second class for a second, higher performance core.

Example 15. The method of example 13, wherein the respective classes comprise a first class for an integer type of vector instruction and a second class for a floating-point type of vector instruction.

Example 16. The method of example 9, further comprising storing a hint, by the hardware guide scheduler, for a next software thread that is to be executed on the hardware processor, in a register of the hardware processor to indicate to an operating system a core type of a plurality of cores types of the hardware processor, and the hint is based on the plurality of software thread runtime property histories.

Example 17. A non-transitory machine readable medium that stores code that when executed by a machine causes the machine to perform a method comprising:
decoding a single instruction into a decoded single instruction with a decoder of a hardware processor, the single instruction having a field that identifies a control register; and
executing the decoded single instruction with an execution circuit of the hardware processor to:
check that an enable bit of the control register is set, and when the enable bit is set, to reset a plurality of software thread runtime property histories of a hardware guide scheduler of the hardware processor.

Example 18. The non-transitory machine readable medium of example 17, wherein, when the enable bit is set, the executing the decoded single instruction resets the plurality of software thread runtime property histories of the hardware guide scheduler without modifying other architectural state of the hardware processor.

Example 19. The non-transitory machine readable medium of example 17, wherein an opcode of the single instruction is a legacy opcode, and when the enable bit is not set, the execution circuit executes the single instruction as a no-operation.

Example 20. The non-transitory machine readable medium of example 17, wherein, when the enable bit is set, the executing the decoded single instruction resets the plurality of software thread runtime property histories of the hardware guide scheduler only when the single instruction is requested for execution by an operating system.

Example 21. The non-transitory machine readable medium of example 17, wherein the plurality of software thread runtime property histories comprises a plurality of weights for respective classes of performance monitoring events for a plurality of cores of the hardware processor.

Example 22. The non-transitory machine readable medium of example 21, wherein the respective classes comprise a first class for a first type of core and a second class for a second, higher performance core.

Example 23. The non-transitory machine readable medium of example 21, wherein the respective classes comprise a first class for an integer type of vector instruction and a second class for a floating-point type of vector instruction.

Example 24. The non-transitory machine readable medium of example 17, further comprising storing a hint, by the hardware guide scheduler, for a next software thread that is to be executed on the hardware processor, in a register of the hardware processor to indicate to an operating system a core type of a plurality of cores types of the hardware processor, and the hint is based on the plurality of software thread runtime property histories.

Example 25. The non-transitory machine readable medium of example 17, further comprising translating the single instruction into one or more instructions of a different instruction set architecture prior to the decoding, wherein executing of the one or more instructions of the different instruction set architecture is to be functionally equivalent as the executing of the decoded single instruction.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 10A:
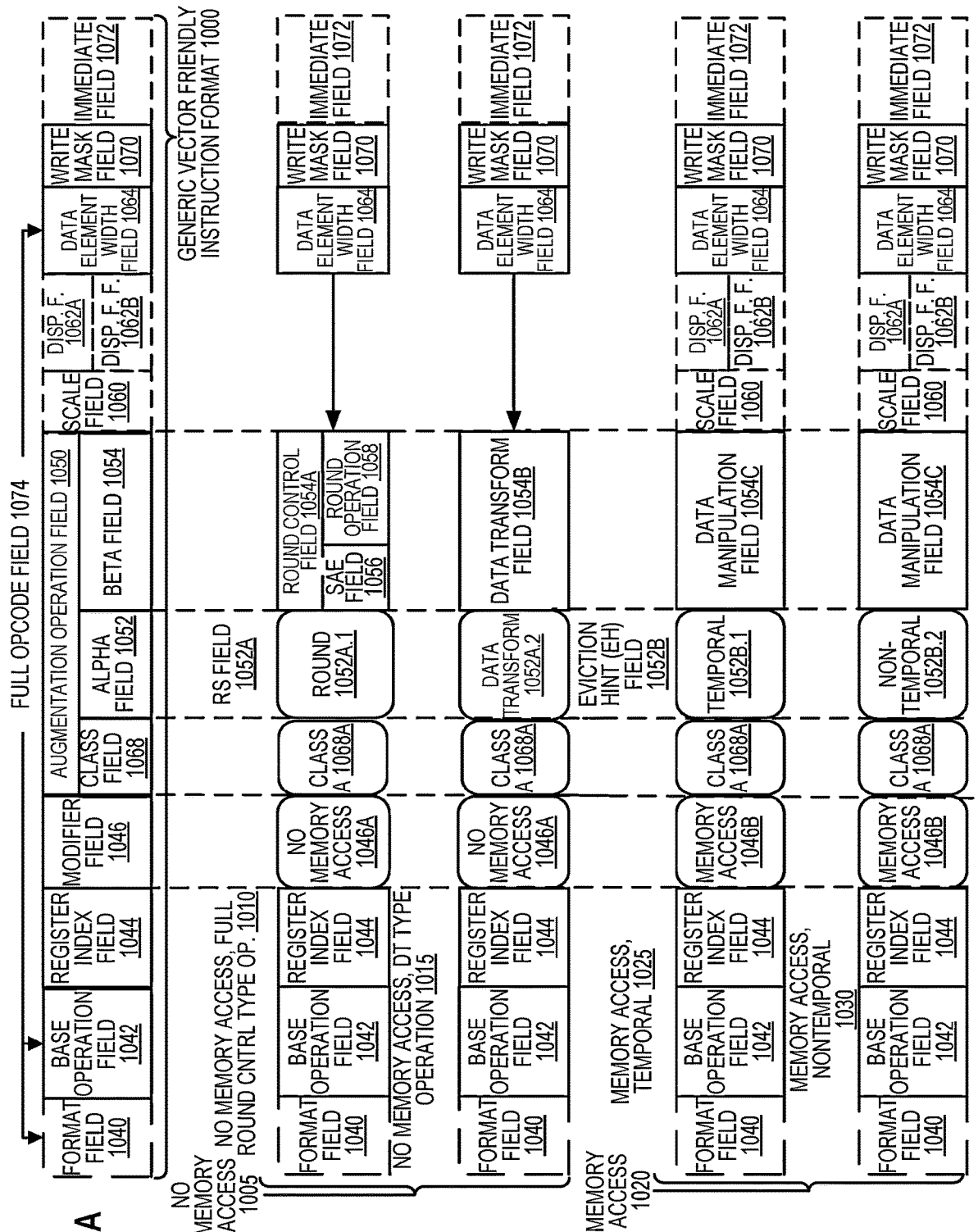
FIG. 10A is a block diagram illustrating a generic vector friendly instruction format and class A instruction templates thereof according to embodiments of the disclosure.
Figure 10B:
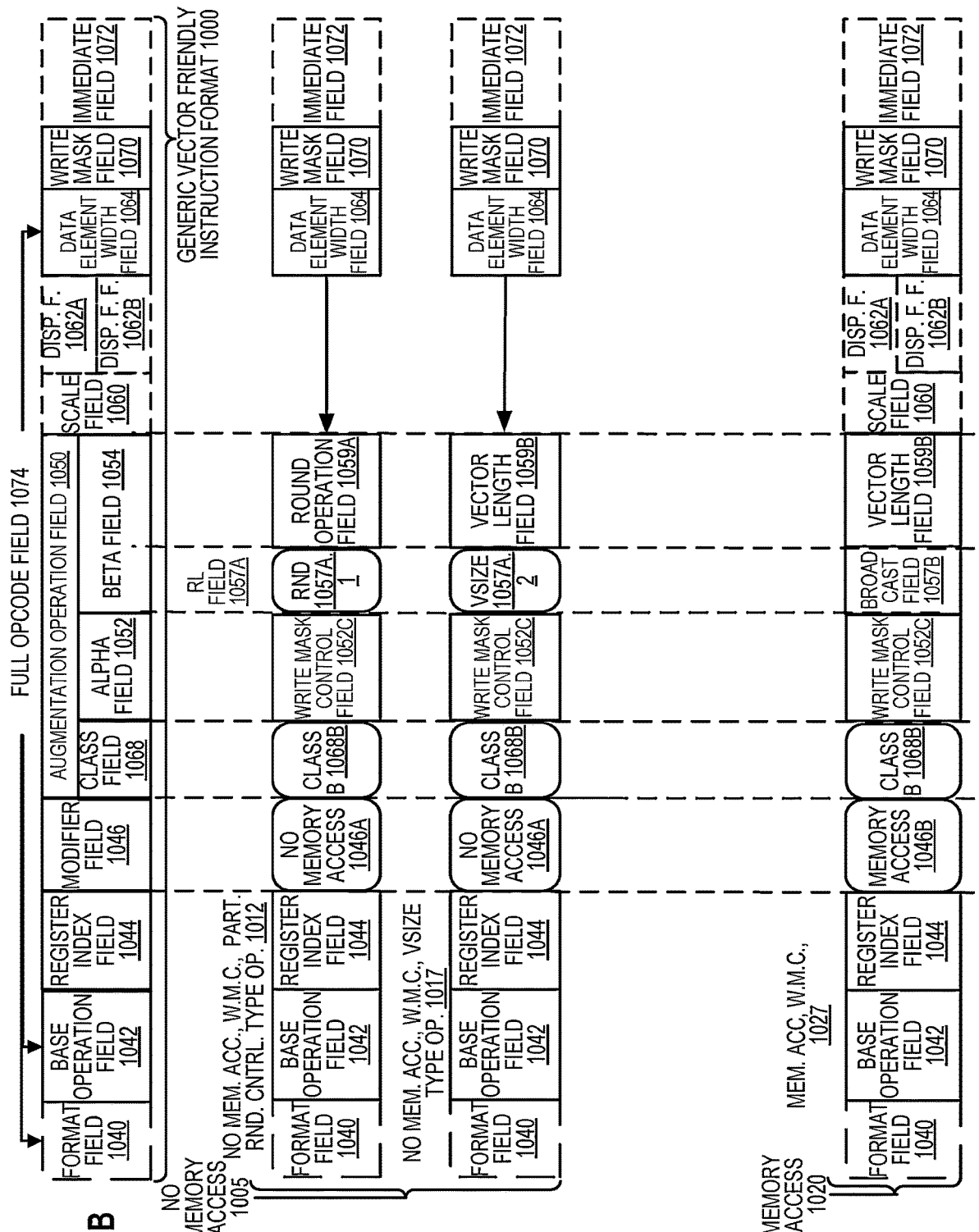
FIG. 10B is a block diagram illustrating the generic vector friendly instruction format and class B instruction templates thereof according to embodiments of the disclosure.

FIGS. 10A-10B are block diagrams illustrating a generic vector friendly instruction format and instruction templates thereof according to embodiments of the disclosure. FIG. 10A is a block diagram illustrating a generic vector friendly instruction format and class A instruction templates thereof according to embodiments of the disclosure; while FIG. 10B is a block diagram illustrating the generic vector friendly instruction format and class B instruction templates thereof according to embodiments of the disclosure. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector oper- and sizes (e.g., 256 byte vector operands) with more, less, or different data element widths (e.g., 128 bit (16 byte) data element widths).

The class A instruction templates in FIG. 10A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 10B include: 1) within the no memory access 1005 instruction templates there is shown a no memory access, write mask control, partial round control type operation 1012 instruction template and a no memory access, write mask control, vsize type operation 1017 instruction template; and 2) within the memory access 1020 instruction templates there is shown a memory access, write mask control 1027 instruction template.

The generic vector friendly instruction format 1000 includes the following fields listed below in the order illustrated in FIGS. 10A-10B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1050—its content distinguishes which one of a variety of different operations to be performed in addition to the base operation. This field is context specific. In one embodiment of the disclosure, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses $2^{scale}$*index+base).

Displacement Field 1062A—its content is used as part of memory address generation (e.g., for address generation that uses $2^{scale}$*index+base+displacement).

Displacement Factor Field 1062B (note that the juxtaposition of displacement field 1062A directly over displacement factor field 1062B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While embodiments of the disclosure are described in which the write mask field's 1070 content selects one of a number of write mask registers that contains the write mask to be used (and thus the write mask field's 1070 content indirectly identifies that masking to be performed), alternative embodiments instead or additional allow the mask write field's 1070 content to directly specify the masking to be performed.

Immediate field 1072—its content allows for the specification of an immediate. This field is optional in the sense that it is not present in an implementation of the generic vector friendly format that does not support immediate and it is not present in instructions that do not use an immediate.

Class field 1068—its content distinguishes between different classes of instructions. With reference to FIGS. 10A-B, the contents of this field select between class A and class B instructions. In FIGS. 10A-B, rounded corner squares are used to indicate a specific value is present in a field (e.g., class A 1068A and class B 1068B for the class field 1068 respectively in FIGS. 10A-B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement scale field 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described embodiments of the disclosure the round control field 1054A includes a suppress all floating point exceptions (SAE) field 1056 and a round operation control field 1058, alternative embodiments may support may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating-point exception flag and does not raise any floating point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In one embodiment of the disclosure where a processor includes a control register for specifying rounding modes, the round operation control field's 1058 content overrides that register value.

No Memory Access Instruction Templates—Data Transform Type Operation

In the no memory access data transform type operation 1015 instruction template, the beta field 1054 is interpreted as a data transform field 1054B, whose content distinguishes which one of a number of data transforms is to be performed (e.g., no data transform, swizzle, broadcast).

In the case of a memory access 1020 instruction template of class A, the alpha field 1052 is interpreted as an eviction hint field 1052B, whose content distinguishes which one of the eviction hints is to be used (in FIG. 10A, temporal 1052B.1 and non-temporal 1052B.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 1062B.

Vector memory instructions perform vector loads from and vector stores to memory, with conversion support. As with regular vector instructions, vector memory instructions transfer data from/to memory in a data element-wise fashion, with the elements that are actually transferred being dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement scale field 1062B are not present.

In the no memory access, write mask control, partial round control type operation 1010 instruction template, the rest of the beta field 1054 is interpreted as a round operation field 1059A and exception event reporting is disabled (a given instruction does not report any kind of floating-point exception flag and does not raise any floating point exception handler).

Round operation control field 1059A—just as round operation control field 1058, its content distinguishes which one of a group of rounding operations to perform (e.g., Round-up, Round-down, Round-towards-zero and Round-to-nearest). Thus, the round operation control field 1059A allows for the changing of the rounding mode on a per instruction basis. In one embodiment of the disclosure where a processor includes a control register for specifying rounding modes, the round operation control field's 1058 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128-, 256-, or 512-byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted the vector length field 1059B. The memory access 1020 instruction templates include the scale field 1060, and optionally the displacement field 1062A or the displacement scale field 1062B.

With regard to the generic vector friendly instruction format 1000, a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 11 is a block diagram illustrating an exemplary specific vector friendly instruction format according to embodiments of the disclosure. FIG. 11 shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 10 into which the fields from FIG. 11 map are illustrated.

It should be understood that, although embodiments of the disclosure are described with reference to the specific vector friendly instruction format 1100 in the context of the generic vector friendly instruction format 1000 for illustrative purposes, the disclosure is not limited to the specific vector friendly instruction format 1100 except where claimed. For example, the generic vector friendly instruction format 1000 contemplates a variety of possible sizes for the various fields, while the specific vector friendly instruction format 1100 is shown as having fields of specific sizes. By way of specific example, while the data element width field 1064 is illustrated as a one bit field in the specific vector friendly instruction format 1100, the disclosure is not so limited (that is, the generic vector friendly instruction format 1000 contemplates other sizes of the data element width field 1064).

The generic vector friendly instruction format 1000 includes the following fields listed below in the order illustrated in FIG. 11A.

EVEX Prefix (Bytes 0-3) 1102—is encoded in a four-byte form.

Format Field 1040 (EVEX Byte 0, bits [7:0])—the first byte (EVEX Byte 0) is the format field 1040 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1105 (EVEX Byte 1, bits [7-5])—consists of an EVEX.R bit field (EVEX Byte 1, bit [7]-R), EVEX.X bit field (EVEX byte 1, bit [6]-X), and 1057BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1010—this is the first part of the REX' field 1010 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]-mmmm)—its content encodes an implied leading opcode byte (0F, 0F 38, or 0F 3).

Data element width field 1064 (EVEX byte 2, bit [7]-W)—is represented by the notation EVEX.W. EVEX.W is used to define the granularity (size) of the datatype (either 32-bit data elements or 64-bit data elements).

EVEX.vvvv 1120 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]-U)—If EVEX.U=0, it indicates class A or EVEX.U0; if EVEX.U=1, it indicates class B or EVEX.U1.

Prefix encoding field 1125 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decode circuit's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7]-EH; also known as EVEX.EH, EVEX.rs, EVEX.RL, EVEX.write mask control, and EVEX.N; also illustrated with a)—as previously described, this field is context specific.

Beta field 1054 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1010—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand, or be treated as an opcode extension and not used to encode any instruction operand. The role of R/M field 1146 may include the following: encoding the instruction operand that references a memory address, or encoding either the destination register operand or a source register operand.

Scale, Index, Base (SIB) Byte (Byte 6)—As previously described, the scale field's 1060 content is used for memory address generation. SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1072 operates as previously described.

Full Opcode Field

FIG. 11B is a block diagram illustrating the fields of the specific vector friendly instruction format 1100 that make up the full opcode field 1074 according to one embodiment of the disclosure. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

FIG. 11C is a block diagram illustrating the fields of the specific vector friendly instruction format 1100 that make up the register index field 1044 according to one embodiment of the disclosure. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
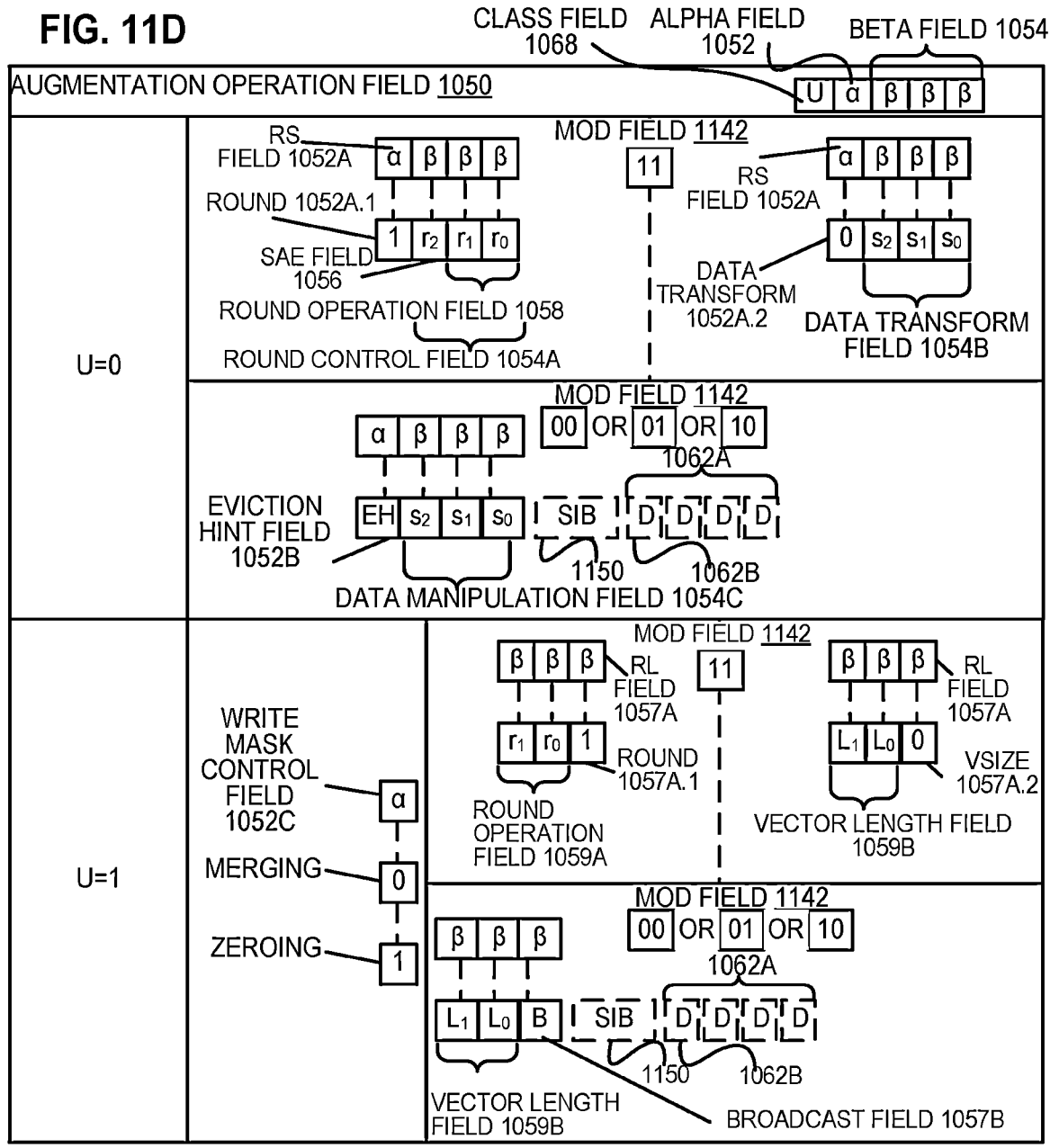
FIG. 11D is a block diagram illustrating the fields of the specific vector friendly instruction format in FIG. 11A that make up the augmentation operation field 1050 according to one embodiment of the disclosure.

FIG. 11D is a block diagram illustrating the fields of the specific vector friendly instruction format 1100 that make up the augmentation operation field 1050 according to one embodiment of the disclosure. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]-EH) is interpreted as the rs field 1052A. When the rs field 1052A contains a 1 (round 1052A.1), the beta field 1054 (EVEX byte 3, bits [6:4]-SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]-SSS) is interpreted as a three bit data transform field 1054B. When U=0 and the MOD field 1142 contains 00, 01, or 10 (signifying a memory access operation), the alpha field 1052 (EVEX byte 3, bit [7]-EH) is interpreted as the eviction hint (EH) field 1052B and the beta field 1054 (EVEX byte 3, bits [6:4]-SSS) is interpreted as a three bit data manipulation field 1054C.

When U=1, the alpha field 1052 (EVEX byte 3, bit [7]-EH) is interpreted as the write mask control (Z) field 1052C. When U=1 and the MOD field 1142 contains 11 (signifying a no memory access operation), part of the beta field 1054 (EVEX byte 3, bit [4]-$S_0$) is interpreted as the RL field 1057A; when it contains a 1 (round 1057A.1) the rest of the beta field 1054 (EVEX byte 3, bit [6-5]-$S_{2-1}$) is interpreted as the round operation field 1059A, while when the RL field 1057A contains a 0 (VSIZE 1057.A2) the rest of the beta field 1054 (EVEX byte 3, bit [6-5]-$S_{2-1}$) is interpreted as the vector length field 1059B (EVEX byte 3, bit [6-5]-$L_{1-0}$). When U=1 and the MOD field 1142 contains 00, 01, or 10 (signifying a memory access operation), the beta field 1054 (EVEX byte 3, bits [6:4]-SSS) is interpreted as the vector length field 1059B (EVEX byte 3, bit [6-5]-$L_{1-0}$) and the broadcast field 1057B (EVEX byte 3, bit [4]-B).

Exemplary Register Architecture

Figure 12:
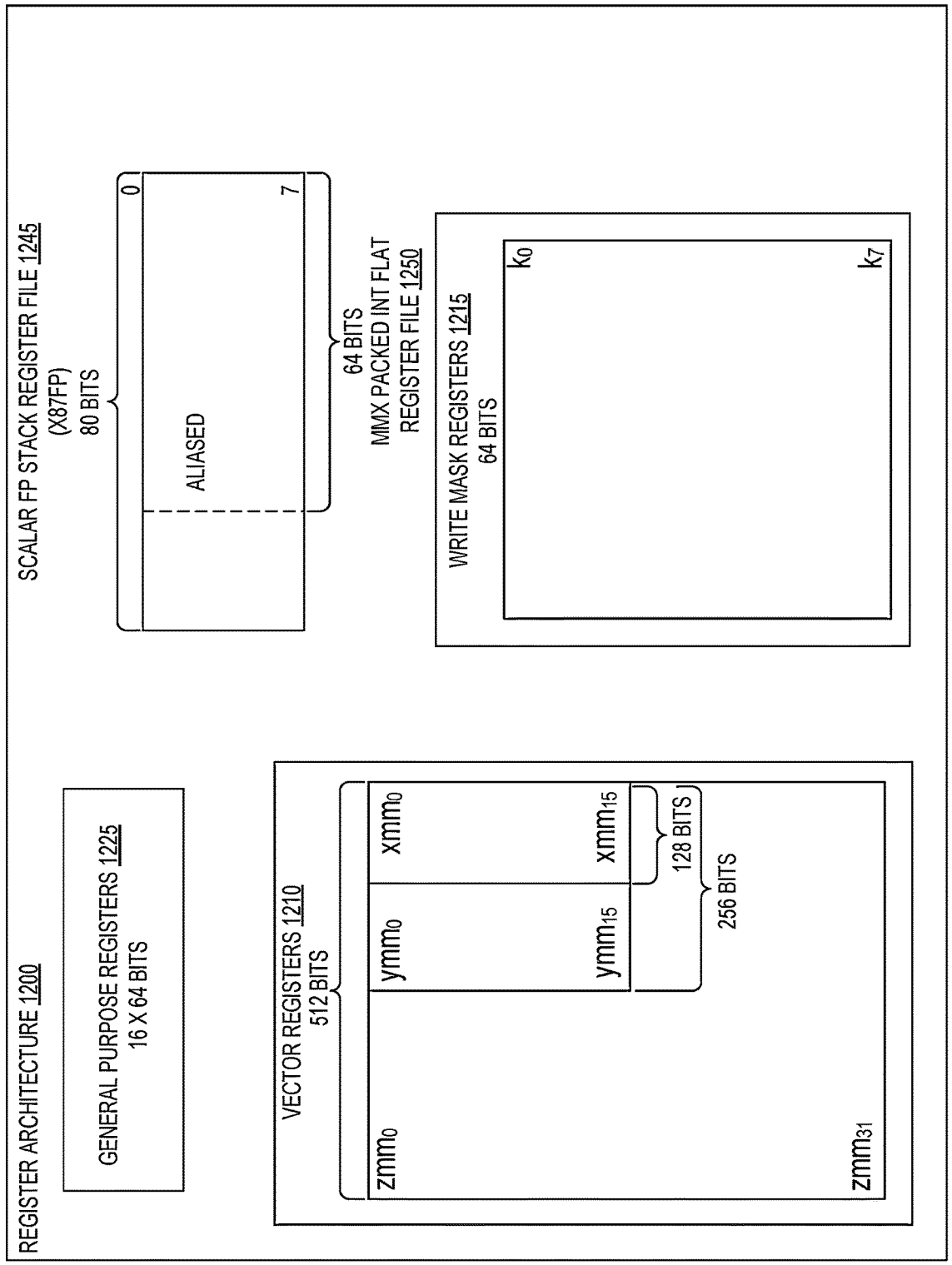
FIG. 12 is a block diagram of a register architecture according to one embodiment of the disclosure

FIG. 12 is a block diagram of a register architecture 1200 according to one embodiment of the disclosure. In the embodiment illustrated, there are 32 vector registers 1210 that are 512 bits wide; these registers are referenced as zmm0 through zmm31. The lower order 256 bits of the lower 16 zmm registers are overlaid on registers ymm0-15. The lower order 128 bits of the lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
| --- | --- | --- | --- |
| Instruction Templates that do not include the vector length field 1059B | A (FIG. 10A; U = 0) | 1010, 1015, 1025, 1030 | zmm registers (the vector length is 64 byte) |
| | B (FIG. 10B; U = 1) | 1012 | zmm registers (the vector length is 64 byte) |
| Instruction templates that do include the vector length field 1059B | B (FIG. 10B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one embodiment, the class B instruction templates of the specific vector friendly instruction format 1100 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 13A is a block diagram illustrating both an exemplary in-order pipeline and an exemplary register renaming, out-of-order issue/execution pipeline according to embodiments of the disclosure. FIG. 13B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (e.g., decode circuit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macro-instructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 1354 and the physical register file(s) unit(s) 1358 are coupled to the execution cluster(s) 1360. The execution cluster(s) 1360 includes a set of one or more execution units 1362 (e.g., execution circuits) and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 14B:
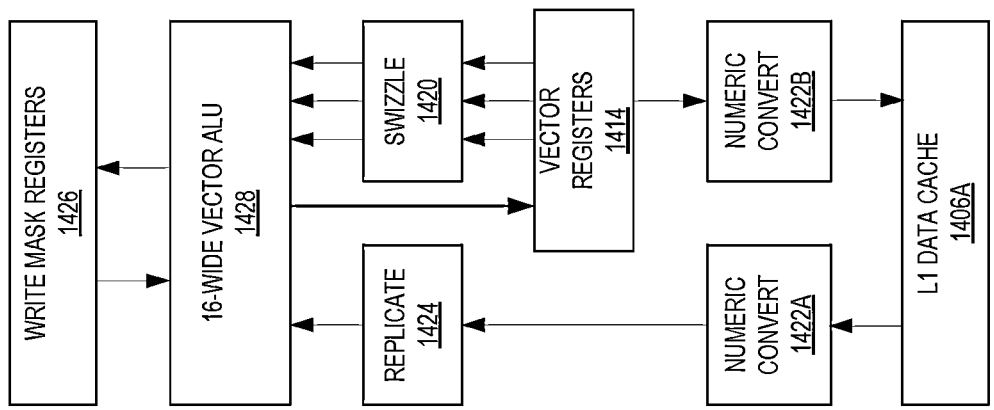
FIG. 14B is an expanded view of part of the processor core in FIG. 14A according to embodiments of the disclosure.
Figure 14A:
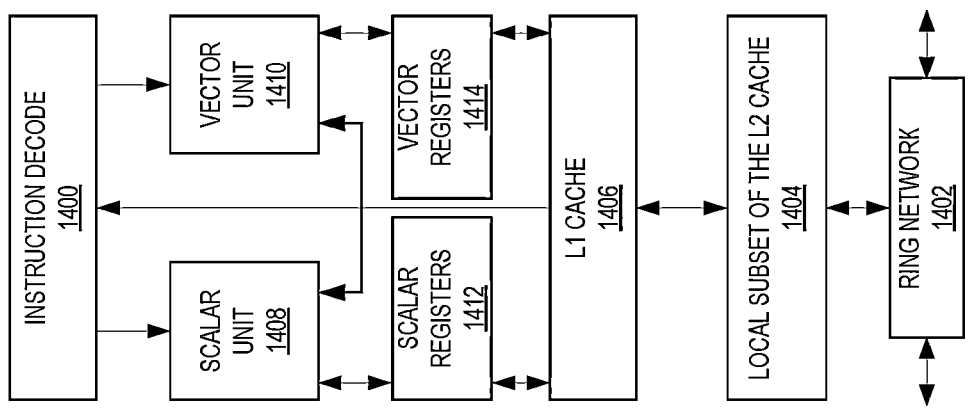
FIG. 14A is a block diagram of a single processor core, along with its connection to the on-die interconnect network and with its local subset of the Level 2 (L2) cache, according to embodiments of the disclosure.

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network (e.g., ring network 1402) and with its local subset of the Level 2 (L2) cache 1404, according to embodiments of the disclosure. In one embodiment, an instruction decode unit 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the disclosure may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the disclosure. FIG. 14B includes an L1 data cache 1406A part of the L1 cache 1406, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 15:
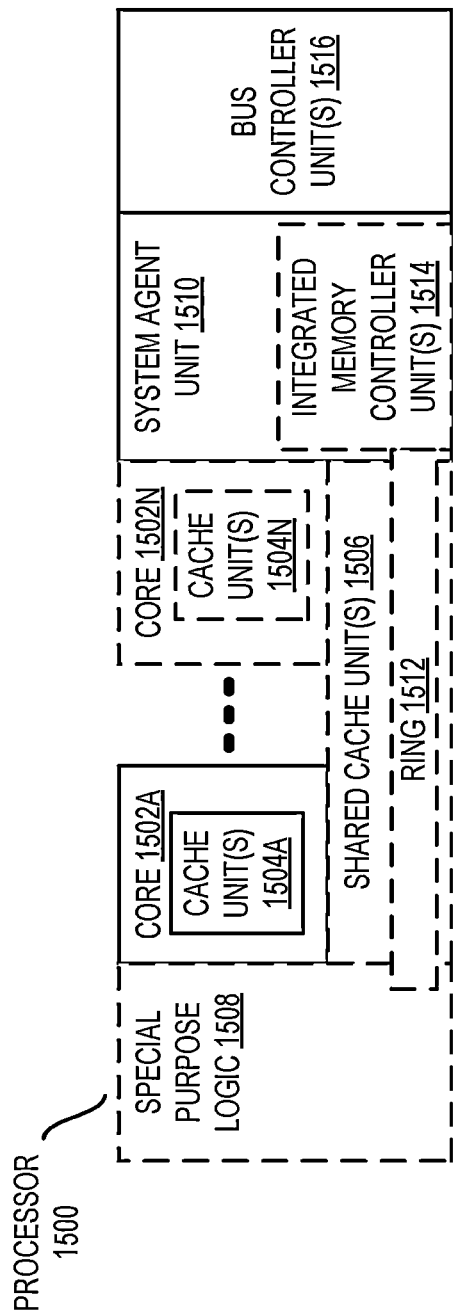
FIG. 15 is a block diagram of a processor that may have more than one core, may have an integrated memory controller, and may have integrated graphics according to embodiments of the disclosure.

FIG. 15 is a block diagram of a processor 1500 that may have more than one core, may have an integrated memory controller, and may have integrated graphics according to embodiments of the disclosure. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput) computing; and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache 1504A-1504N within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502A-N.

In some embodiments, one or more of the cores 1502A-N are capable of multithreading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of executing the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
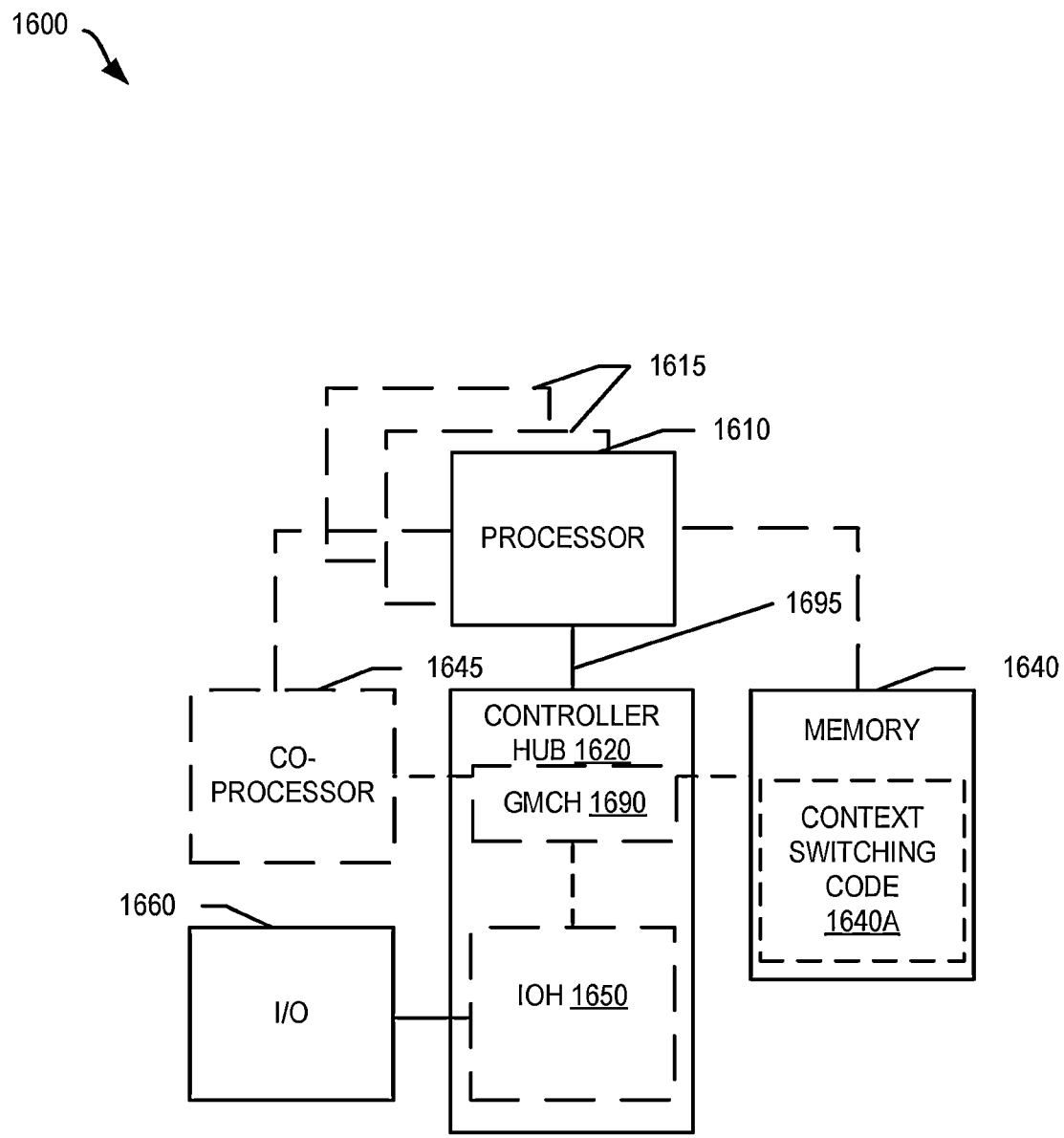
FIG. 16 is a block diagram of a system in accordance with one embodiment of the present disclosure.

Referring now to FIG. 16, shown is a block diagram of a system 1600 in accordance with one embodiment of the present disclosure. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is-couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650. Memory 1640 may include context switching code 1640A, for example, to store code that when executed causes a processor to perform any method of this disclosure.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as Quickpath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the processor(s) 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
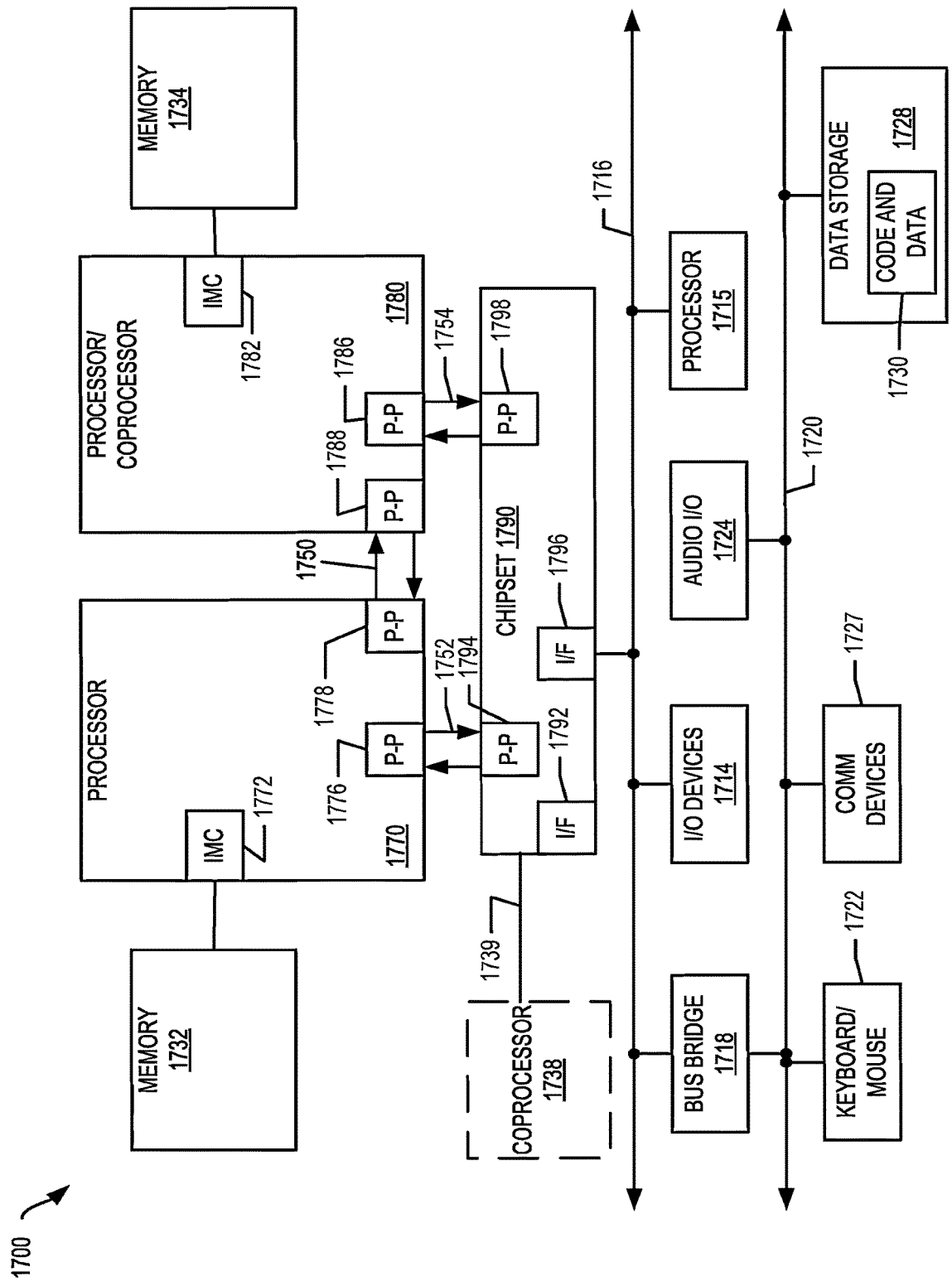
FIG. 17 is a block diagram of a more specific exemplary system in accordance with an embodiment of the present disclosure.

Referring now to FIG. 17, shown is a block diagram of a first more specific exemplary system 1700 in accordance with an embodiment of the present disclosure. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the disclosure, processors 1770 and 1780 are respectively processors 1610 and 1615, while coprocessor 1738 is coprocessor 1645. In another embodiment, processors 1770 and 1780 are respectively processor 1610 and coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present disclosure is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
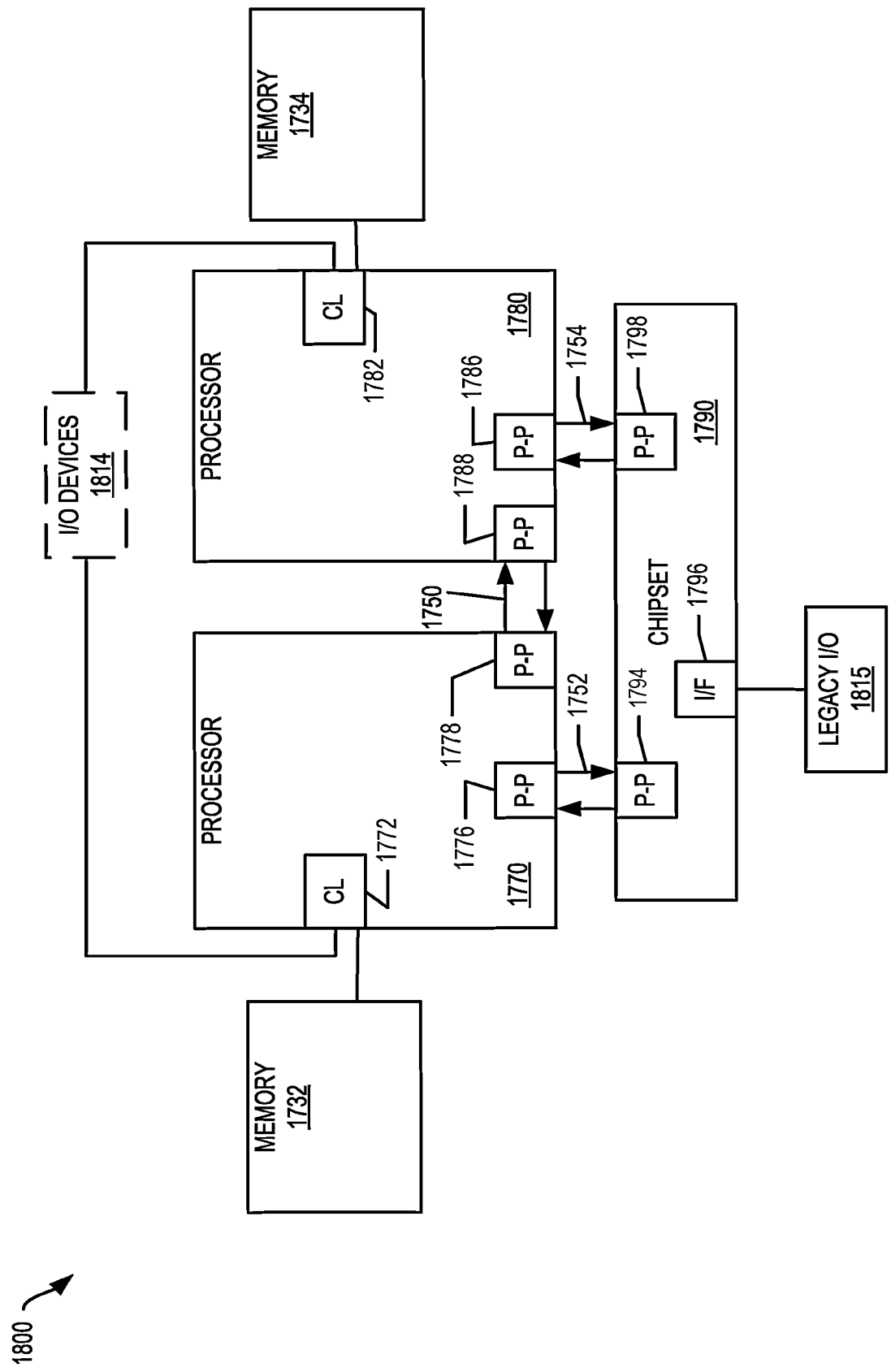
FIG. 18 is a block diagram of a second more specific exemplary system in accordance with an embodiment of the present disclosure.

Referring now to FIG. 18, shown is a block diagram of a second more specific exemplary system 1800 in accordance with an embodiment of the present disclosure. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
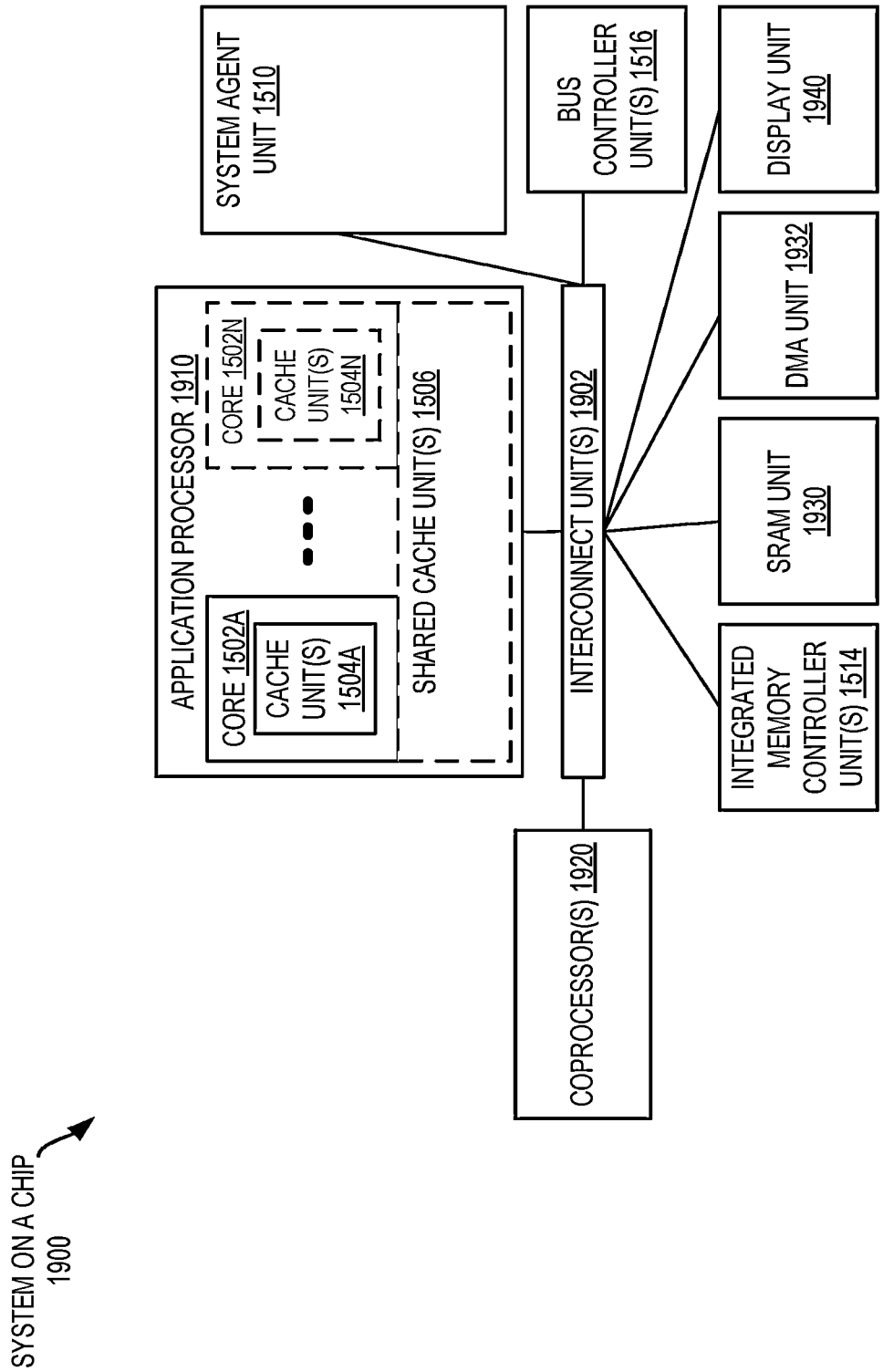
FIG. 19 is a block diagram of a system on a chip (SoC) in accordance with an embodiment of the present disclosure.

Referring now to FIG. 19, shown is a block diagram of a SoC 1900 in accordance with an embodiment of the present disclosure. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 1502A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; a static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code in instructions/code and data 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
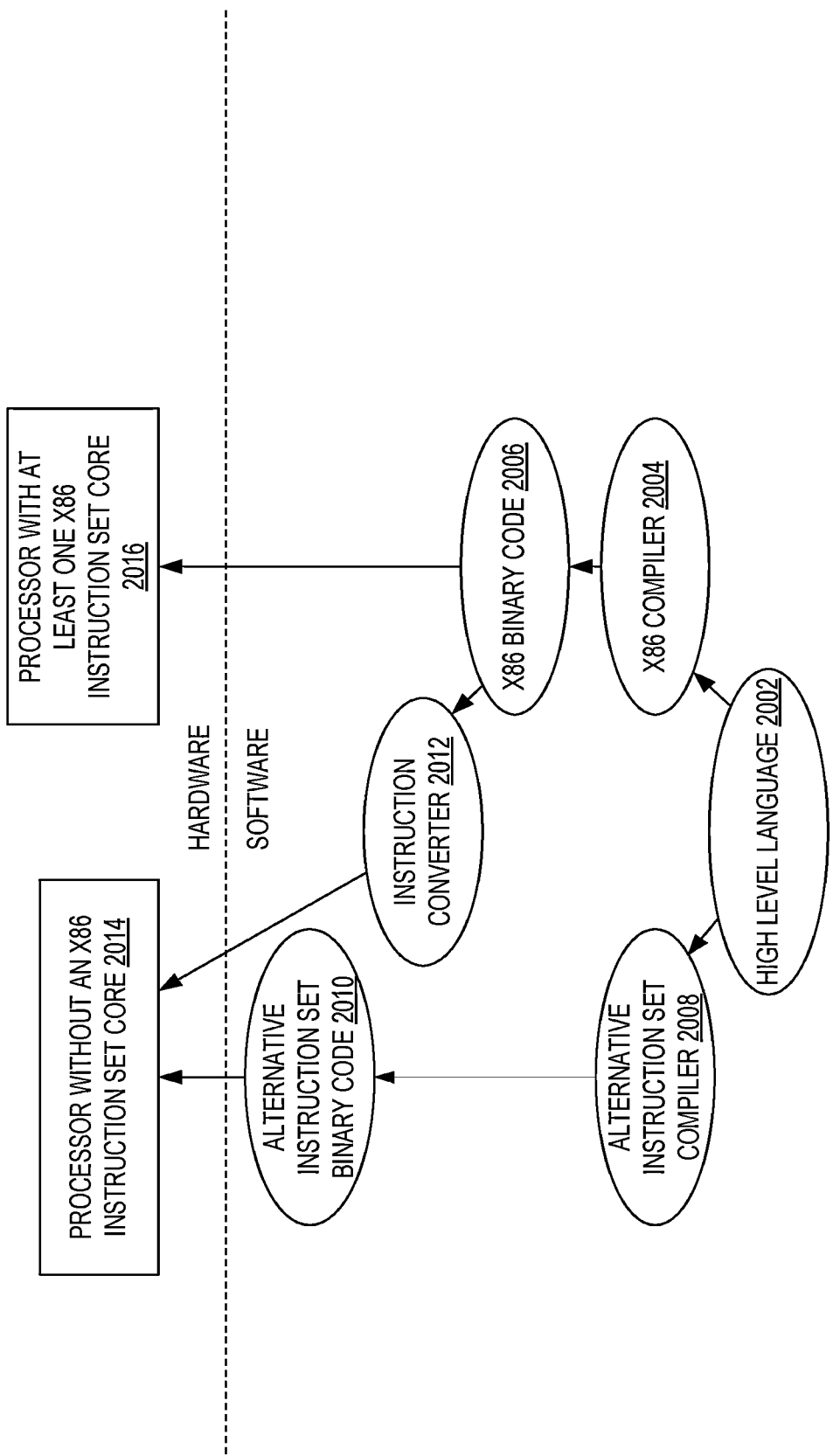
FIG. 20 is a block diagram contrasting the use of a software instruction converter to convert binary instructions in a source instruction set to binary instructions in a target instruction set according to embodiments of the disclosure.

FIG. 20 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, CA and/or that execute the ARM instruction set of ARM Holdings of Sunnyvale, CA). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

What is claimed is:

1. A hardware processor comprising:
a plurality of logical processors;
circuitry to provide a plurality of software thread runtime property histories for the plurality of logical processors;
a decoder to decode a single instruction into a decoded single instruction, the single instruction having an operand; and
an execution circuit to execute the decoded single instruction to reset at least one software thread runtime property history, of a logical processor that executes the single instruction, of the plurality of software thread runtime property histories of the circuitry according to a value from the operand.

2. The hardware processor of claim 1, further comprising a control register, wherein the execution circuit is to generate a general protection fault when any set bit of the value from the operand does not have a corresponding set bit in the control register.

3. The hardware processor of claim 1, wherein when the value from the operand is zero, the execution circuit is to execute the decoded single instruction as a no-operation.

4. The hardware processor of claim 1, wherein the execution circuit is to execute the decoded single instruction to reset the at least one software thread runtime property history only when the single instruction is requested for execution at a privilege level of zero.

5. The hardware processor of claim 1, wherein any attempt to execute the single instruction inside a transactional region results in a transaction abort.

6. The hardware processor of claim 1, wherein the single instruction comprises a value, of an explicit immediate operand, that is ignored.

7. The hardware processor of claim 1, wherein the plurality of software thread runtime property histories comprise a software thread runtime property history for each of a plurality of classes for each logical processor of the plurality of logical processors.

8. The hardware processor of claim 7, wherein the plurality of logical processors are implemented on a plurality of hardware cores.

9. The hardware processor of claim 1, wherein the operand is an implicit operand.

10. A system comprising:
a system memory;
a plurality of logical processors;
circuitry to provide a plurality of software thread runtime property histories, in the system memory, for the plurality of logical processors;
a decoder to decode a single instruction into a decoded single instruction, the single instruction having an operand; and
an execution circuit to execute the decoded single instruction to reset at least one software thread runtime property history, of a logical processor that executes the single instruction, of the plurality of software thread runtime property histories of the circuitry according to a value from the operand.

11. The system of claim 10, further comprising a control register, wherein the execution circuit is to generate a general protection fault when any set bit of the value from the operand does not have a corresponding set bit in the control register.

12. The system of claim 10, wherein when the value from the operand is zero, the execution circuit is to execute the decoded single instruction as a no-operation.

13. The system of claim 10, wherein the execution circuit is to execute the decoded single instruction to reset the at least one software thread runtime property history only when the single instruction is requested for execution at a privilege level of zero.

14. The system of claim 10, wherein any attempt to execute the single instruction inside a transactional region results in a transaction abort.

15. The system of claim 10, wherein the single instruction comprises a value, of an explicit immediate operand, that is ignored.

16. The system of claim 10, wherein the plurality of software thread runtime property histories comprise a software thread runtime property history for each of a plurality of classes for each logical processor of the plurality of logical processors.

17. The system of claim 16, wherein the plurality of logical processors are implemented on a plurality of hardware cores.

18. The system of claim 10, wherein the operand is an implicit operand.

19. A non-transitory machine readable medium that stores code that when executed by a machine causes the machine to perform a method comprising:
decoding a single instruction into a decoded single instruction with a decoder of a processor, the single instruction having an operand and the processor comprising a plurality of logical processors, and circuitry to provide a plurality of software thread runtime property histories for the plurality of logical processors; and
executing the decoded single instruction with an execution circuit of the processor to reset at least one software thread runtime property history, of a logical processor that executes the single instruction, of the plurality of software thread runtime property histories of the circuitry according to a value from the operand.

20. The non-transitory machine readable medium of claim 19, wherein the processor further comprises a control register, and the executing generates a general protection fault when any set bit of the value from the operand does not have a corresponding set bit in the control register.

* * * * *